United States Patent [19]

Ogimoto et al.

[11] Patent Number: 6,032,205
[45] Date of Patent: Feb. 29, 2000

[54] CROSSBAR SWITCH SYSTEM FOR ALWAYS TRANSFERRING NORMAL MESSAGES AND SELECTIVELY TRANSFERRING BROADCAST MESSAGES FROM INPUT BUFFER TO OUTPUT BUFFER WHEN IT HAS SUFFICIENT SPACE RESPECTIVELY

[75] Inventors: Takahiro Ogimoto, Hadano; Patrick Hamilton, Machida; Masato Ishii, Sagamihara, all of Japan

[73] Assignee: Hitachi, Ltd., Tokyo, Japan

[21] Appl. No.: 09/032,779

[22] Filed: Mar. 6, 1998

[51] Int. Cl.[7] .............................. G06F 15/00; G06F 13/00
[52] U.S. Cl. .............................. 710/33; 710/52; 710/131; 710/132; 370/230; 370/236; 370/254; 370/419; 370/422; 370/428
[58] Field of Search ..................................... 710/131, 132, 710/20, 29, 33, 36, 52; 709/215; 712/11, 12; 370/230, 236, 254, 419, 422, 428

[56] References Cited

U.S. PATENT DOCUMENTS

| 5,179,558 | 1/1993 | Thacker et al. | 370/406 |
|---|---|---|---|
| 5,179,669 | 1/1993 | Peters | 710/132 |
| 5,408,613 | 4/1995 | Okabayashi | 709/234 |
| 5,553,078 | 9/1996 | Horie | 370/389 |
| 5,634,004 | 5/1997 | Gopinath et al. | 710/132 |
| 5,680,402 | 10/1997 | Olnowich et al. | 370/498 |
| 5,822,605 | 10/1998 | Higuchi et al. | 712/11 |
| 5,838,684 | 11/1998 | Wicki et al. | 370/416 |
| 5,852,407 | 12/1998 | Ishii et al. | 340/825 |
| 5,914,953 | 6/1999 | Krause et al. | 370/392 |

*Primary Examiner*—Thomas C. Lee
*Assistant Examiner*—Raju Tamrakar
*Attorney, Agent, or Firm*—Antonelli, Terry, Stout & Kraus, LLP

[57] ABSTRACT

A crossbar switch and a broadcast communication method for use in a parallel computer that avoids an occurrence of deadlock states caused by conflicts for use of a path by a plurality of broadcast messages. The parallel computer, in which a plurality of nodes are connected by a crossbar switch, is provided with output buffer monitoring circuits. A vacant capacity of each of the output buffers is monitored. The vacant capacity of each output buffer is monitored to ensure that it is sufficiently high to store the broadcast message. The parallel computer is also provided with a priority controller in which one of a plurality of broadcast messages is selected when they are input. The message transmission-permit signal is issued to the packet selector circuits only when the broadcast transmission-permit signals for all the output ports for transmitting the message are issued. The broadcast transmission-permit signals are issued only when the vacant capacity of each output buffer is sufficiently high to store a broadcast message.

29 Claims, 12 Drawing Sheets

REQUEST ISSUING CIRCUIT 41

REQUEST ADJUSTMENT CIRCUIT 45

MESSAGE FORMAT
SYNCHRONOUS BIT

CROSSBAR SWITCH SYSTEM FOR ALWAYS TRANSFERRING NORMAL MESSAGES AND SELECTIVELY TRANSFERRING BROADCAST MESSAGES FROM INPUT BUFFER TO OUTPUT BUFFER WHEN IT HAS SUFFICIENT SPACE RESPECTIVELY

BACKGROUND OF THE INVENTION

The present invention relates to a crossbar switch, having a plurality of input ports and a plurality of output ports, for sending messages input to the input ports to an selected output port. More particularly the present invention relates to a crossbar switch for use in a parallel computer having a plurality of computers connected to a switch type network and a broadcast communication method thereof for avoiding a deadlock between broadcast messages within the switch type network.

When a large amount of data is to be communicated in a parallel computer which performs data transfer between a plurality of processors (hereinafter called as nodes) through a network, it has been known to not transfer the data as one message, instead the message is divided into a plurality of parts of optional length, that are transferred as a plurality of messages. A "message" as used in the following description is intended to mean a message having an optional length.

An important data transfer function in the parallel computer is a broadcast function for transferring data in parallel from one node to a plurality of the nodes. However, when the parallel computer transfers messages between a plurality of nodes through a switch-type network, a deadlock sometimes occurs due to competition between the messages for use of the transfer path. Referring now to FIGS. 2 through 4, the general construction and operation of the conventional parallel computer will be described.

FIG. 2 illustrates a parallel computer in which four nodes are connected through four-input/four-output crossbar switch of one stage, FIG. 3 is a configuration view for illustrating a header decode circuit illustrated in FIG. 2, and FIG. 4 is configuration view for illustrating the priority controller illustrated in FIG. 2.

The parallel computer illustrated in FIG. 2 includes four nodes 11 to 14, a crossbar switch 10 with four input/output ports 0 to 3, and signal lines 150 to 153, 170 to 173, respectively. The node 11 includes a command processing device (IP) 101, a main memory device (MS) 102, a message receiving section (RCV) 103, a message transmission section (SND) 104. Each of the other nodes 12 to 14 can be constructed in the same way as the node 11. In this case, it is assumed that SND 104 performs a transfer of 1 word in one cycle. Each of the nodes 11 to 14 is connected to the crossbar switch 10 by input ports 0 to 3 through respective signal lines 150 to 153 and by output ports 0 to 3 through respective signal lines 170 to 173. The crossbar switch 10 includes a plurality of input buffers 105 to 108, header decode circuits 109 to 112, a priority controller 113, packet selector circuits 114 to 117, output buffers 118 to 121 and signal lines 154 to 169. The input buffers 105 to 108 and the header decode circuits 109 to 112 are arranged in correspondence with the input ports 0 to 3, and the packet selector circuits 114 to 117 and the output buffers 118 to 121 are arranged in correspondence with the output ports 0 to 3, respectively.

The operation of each of the composing elements of the crossbar switch 10 will be described as follows. The input buffers 105 to 108 receive messages from the nodes 11 to 14 through signal lines 150 to 153 and temporarily store the messages and thereafter performs a transferring of the messages to the output buffers 118 to 121 through packet selector circuits 114 to 117, respectively. The header decode circuits 109 to 112 receive the message words stored in the leading ends of the input buffers 105 to 108 from the input buffers 105 to 108 through signal lines 154 to 157, detect the message header and decode the message header. A priority controller 113 receives the message header information from the header decode circuits 109 to 112 through signal lines 158 to 161, performs issuing and adjustment of a request for use of an output port (request) and issues a message transmission-permit signal to the packet selector circuits 114 to 117 through signal lines 162 to 165.

Each of the packet selector circuits 114 to 117 receives a message from each of the input buffers 105 to 108 through signal lines 154 to 157 and transfers the message from the input buffer to which a signal of permission to transfer message is given in response to the message transmission allowable signal from the priority controller 113 to the output buffers 118 to 121. The output buffers 118 to 121 receive the message from the packet selector circuits 114 to 117 through the signal lines 166 to 169, temporarily store the message, thereafter transfer the message to the nodes 11 to 14 through the signal lines 170 to 173.

Then, referring to FIG. 3, the header decode circuit 109 will be described in detail. The other header decode circuits 110 to 112 are similarly constructed.

The header decode circuit 109 includes a message header register 201, a crossbar (XB) stage storing register 202, a synchronization latch 203, an AND circuit 204, a select circuit 205, a decode circuit 206, a broadcast register 207, a select circuit 208, an AND circuit 209 and signal lines 251 to 264. In this case, it is assumed that the message inputted from the node to the crossbar switch has a format as illustrated in FIG. 13 and includes a packet synchronization bit, a broadcast bit and an destination output port address for every stage of the crossbar switch under a multi-stage formation.

Accordingly, although the message header register 201 is revised every time a message word is transferred, the contents of the message header register 201 is valid only when a message word transmitted from the input buffer 105 is a leading word, namely a message header. Further, a packet synchronization bit is set to zero "0" at the leading end of the message and is set to one "1" at the trailing end of a message. The packet synchronization bit is kept at "1" all the time while the message has not completely reached the message header register 201. Accordingly, the time in which the content of the message header register 201 becomes effective is only a case in which the packet synchronization bit has been changed from "1" to "0". In addition, it is defined that a broadcast bit is set to "1" when the message is a broadcast message and is set to "0" when other messages are applied.

The stage number of each crossbar switch in a multi-stage configuration is stored in an XB stage configuration register 202. In this example, since the network includes one stage of crossbar switches, "0" is stored in the XB stage configuration register 202. A broadcast register 207 is provided with plural bits (4 bits in this example) corresponding to the number of output ports and "1" is stored in the bit corresponding to the port where the broadcast message is outputted. In this example, it is assumed that the broadcast is performed for all the nodes and "1111" is stored in the broadcast register 207. In addition, the signal lines 251 and 264 are bundled and connected to a priority controller 113 as a 5-bit signal line 158.

The message header register 201 receives a message word from the input buffer 105 through the signal line 154. The contents of the header register 201 is revised every cycle. The synchronization latch 203 receives a packet synchronization bit within a message word through a signal line 251 and keeps the packet synchronization bit for 1 cycle. An AND circuit 204 receives an inverting signal of a packet synchronization bit within the message word through the signal line 251 and at the same time receives the packet synchronization bit of the previous cycle from the synchronization latch 203 through the signal line 258. The AND circuit 204 detects whether the packet synchronization bit changes from "1" to "0" so as to discriminate the message header, generates a header discriminating signal and transmits the header discriminating signal to the signal line 259. The select circuit 205 receives each of the destination output port addresses of stages "0" to "3" in the message header register 201 through signal lines 253 to 256, receives the number of stages in the crossbar switch from the XB stage configuration register 202 through a signal line 257 and selects an destination output port address. In this example, the select circuit 205 selects the destination output port address of the stage 0. The decode circuit 206 receives the destination output port address from the select circuit 205 through a signal line 260 and decodes it to a signal of "1" of the bit corresponding to the aforesaid destination output port address with a bit width of for example 4 bits corresponding to the number of output ports.

The select circuit 208 receives the destination output port address decoded from the decode circuit 206 through a signal line 261 and further receives an output port of the broadcast message from the broadcast register 207 through a signal line 262, respectively. The select circuit 208 additionally receives the broadcast bit within the message word as a select signal through a signal line 252. When the broadcast bit is "1", the select circuit 208 selects an output from the broadcast register 207, and when the broadcast bit is "0", the select circuit 208 selects an output from the decode circuit 206 as an output destination output port address signal, respectively. AND circuit 209 receives an output destination output port address signal from the select circuit 208 through a signal line 263 and a header discriminating signal from AND circuit 204 through a signal line 259, respectively. Only when the message word being transmitted from the input buffer 105 is a message header, is an output destination output port address signal output to the signal line 264. The output destination output port address signal (4 bits) of the signal line 264 and the packet synchronization bit (1 bit) of the signal line 251 are given to the priority controller 113 as message header information through the signal line 158.

Referring to FIG. 4, the priority controller 113 will be described in detail. The priority controller 113 includes request issuing circuits 31 to 34, request adjustment circuits 35 to 38, and signal lines 350 to 354, 360 to 364, 370 to 374, 380 to 384, 390 to 394. Each request issuing circuit 31 to 34 is arranged to correspond to the input ports "0" to "3" and each request adjustment circuit 35 to 38 is arranged to be corresponded to the output ports 0 to 3, respectively. The request issuing circuit 31 includes an output destination output port address register 301. The request issuing circuits 32 to 34 each have a similar construction. The request adjustment circuit 35 includes a request latch 302, a counter latch 303, a decode circuit 304, AND circuit 305, OR circuit 306, a 2-bit counter 307 and signal lines 355 to 359. The request adjustment circuits 36 to 38 each have a similar construction.

As described above, the output destination output port address signal in this example has 4 bits and the output destination output port address register 301 of the request issuing circuit 31 has 4 corresponding registers. The output destination output port address signal in the message header information is stored through a signal line 264 included in a signal line 158. Each of the output destination output port address registers 301 is connected to signal lines 350 to 380 for every bit so as to output a request signal to each of the corresponding output ports. A packet synchronization bit in a signal line 251 included in the signal line 158 is output to a signal line 390 as it is. Other request issuing circuits 32 to 34 are constructed similar to the request issuing circuit 31. A signal line 354 is constructed such that four signal lines 350 to 353 corresponding to the output port 0 in each of the request issuing circuits 31 to 34 are bundled together to form a 4-bit signal line. Similarly signal lines 364, 374 and 384 are signal lines in which each of the signal lines 360 to 363 correspond to the output port 1. Signal lines 370 to 373 correspond to the output port 2 and signal lines 381 to 383 correspond to the output port 3. Each of these sets of signal lines are bundled together to form four bits. The signal line 394 is a signal line including four signal lines 390 to 393 each providing a packet synchronization bit from the request issuing circuits 31 to 34. These signal lines are bundled together to form four bits.

Each of request latches 302 of a request adjustment circuit 35 corresponding to the output port "0" is correspondingly arranged for every input ports "0" to "3", i.e. in correspondence with the request issuing circuits 31 to 34 and the latches are constructed by four latches. AND circuit 305 is also similarly constructed to have four AND circuits. Each signal line of the bundled signal lines 354 is connected to a terminal of a latch which forms a part of the request latch 302. Each latch of the request latch 302 corresponds to the input ports. Each signal line of the bundled signal lines 394 is connected to the reset terminals of each latch of the request latch 302. A signal line 162 is a signal line in which four outputs of each AND circuit of AND circuit 305 are bundled together. The signal line 162 provides a message transmission allowable signal corresponding to an input port to issue output of a message to an output port. This signal is transmitted to the packet selector circuit 114 shown in FIG. 2. Request adjustment circuits 36 to 38 corresponding to the output ports 1 to 3 are each constructed similar to the request adjustment circuit 35.

Each of the request issuing circuits 31 to 34 corresponding to each of the input ports receives a message header information from each of the header decode circuits 109 to 112 corresponding to each of the input ports shown in FIG. 2 through signal lines 158 to 161. Each of the request signals from the request issuing circuit 31 to 34 is issued to each of the request adjustment circuits 35 to 38 corresponding to each of the output ports. A packet synchronization bit is output to the signal lines 390 to 393. The request adjustment circuits 35 to 38 receive each of the request signals from the request issuing circuits 31 to 34 through each of signal lines 354, 364, 374 and 384. Also a packet synchronization bit is inputted through the signal line 394. A request adjustment processing is carried out by the request adjustment circuit 35–38. Each of message transmission-permit signals corresponding to an input port and an output port is transmitted to the packet selector circuits 114 to 117 through signal lines 162 to 165, respectively.

Now, operation of each of the components will be described in reference to the request issuing circuit 31 and the request adjustment circuit 35. The output destination output port address register 301 in the request issuing circuit 31 receives an output destination output port address signal from the header decode circuit 109 through a signal line 264. The output destination output port address signal is stored for every bit corresponding to the output port. Each of the request issuing circuits 31 to 34 outputs a request signal to each of the request adjustment circuits 35 to 38 through signal lines 350, 360, 370 and 380, respectively. A request latch 302 corresponding to each of the input ports within the request adjustment circuit 35 inputs a request signal from each of the request issuing circuits 31 to 34 as a set signal through a signal line 354. The request latch 302 also inputs a synchronous signal as a reset signal through the signal line 394. A request from each of the input ports is held until the packet synchronization bit becomes "1". A counter latch 303 receives an output signal of a 2-bit counter 307 through a signal line 359 and holds an input port number for performing an adjustment of the request. The decode circuit 304 receives an output from the counter latch 303 through a signal line 356 and decodes it into 4 bits.

AND circuit 305 corresponding to each of the input ports inputs each of the requests held in the request latch 302 through a signal line 355, and inputs each of decode output signals of the decode circuit 304 through a signal line 358. The AND circuit 305 transmits a message transmission-permit signal corresponding to the input port to the packet selector circuit 114 through a signal line 162 when a request is issued from the input port having a number indicated by the counter latch 303. The signal line 162 is constructed of four bits, wherein the message transmission-permit signal corresponding to the input port 0, for example, becomes "0001". OR circuit 306 receives an output (message transmission-permit signal) from each of AND circuits 305 through a signal line 162 and takes its OR. A 2-bit counter 307 receives an output signal from the counter latch 303 through a signal line 356, receives an output signal from the OR circuit 306 as a count signal (CN) through a signal line 357. The 2-bit counter 307 continues its counting operation during a period in which the message transmission-permit signal is not transmitted and interrupts its counting operation until the transmission of the message is completed when the message transmission-permit signal is not transmitted. Namely, the 2-bit counter 307 re-starts a counting operation when the message transmission of input port number indicated by the counter latch 303 is completed, a signal corresponding to the request latch 302 is reset and a corresponding output of the AND circuit 305 becomes "0". Thus, the result is that an output of the OR circuit 306 becomes "0", respectively.

Then, a flow of operation within the crossbar switch 10 will be described more practically in reference to the case in FIG. 2 in which the node 11 transmits a normal one-to-one communication message (hereinafter called a normal message) for the node 11 (stage 0, destination output port address 0).

A normal message transmitted from SND 104 of the node 11 to the crossbar switch 10 is stored temporarily in the input buffer 105 of the input port "0" through the signal line 150. The leading word of the message within the input buffer 105 is inputted to the header decode circuit 109 through the signal line 154 so as to cause a decode operation of the header to be carried out.

At the message header register 201 within the header decode circuit 109 shown in FIG. 3, at first, the packet synchronization bit is changed from "1" to "0" concurrent with an arrival of the message. The message header is discriminated by AND circuit 204 and the header discrimination signal is asserted. As described above, since an output from the XB stage configuration register 202 is "0", the destination output port address ("0" in this example) in the stage "0" within the message header register 201 is selected at the select circuit 205. The destination output port address signal is decoded to "0001" at the decode circuit 206 and then input to the select circuit 208. When the message to be transmitted is a normal message, the broadcast bit in the message header register 201 is "0" and an output "0001" of the decode circuit 206 is selected at the select circuit 208 as the output destination output port address signal. Since the header discriminating signal is asserted, AND circuit 209 is turned ON. Thus, the output destination output port address signal "0001" in the select circuit 208 is output to the signal line 264. The destination output port address signal is transmitted to the priority controller 113 as message header information together with the packet synchronization bit in the signal line 251 through the signal line 158.

Since portions of a message transmitted from the input buffer 105 through the signal line 154 is varied for every cycle during transmission of the message, the content in the message header register 201 is revised for every cycle and the output of the select circuit 208 is varied. However, the header discriminating signal is not asserted other than at the leading end of the message. Thus, AND circuit 209 is kept OFF and the output signal for the priority controller 113 is kept at "0". The packet synchronization bit is not changed at all.

At the request issuing circuit 31 within the priority controller 113 shown in FIG. 4, the output destination output port address signal so provided by the signal line 264, included in the signal line 158, is divided for every output port and stored in the output destination output port address register 301. Then a request is issued to the request adjustment circuit 35 through signal lines 350, 354. When no request is issued from the other request issuing circuits 32 to 34, a signal transmitted at the signal line 354 becomes "0001". The request adjustment circuits 35 to 38 receives the requests from issued the request issuing circuits 31 to 34. An adjustment processing for a request issued by the request issuing circuits 31 to 34 is carried out in a round-robin manner. At the request adjustment circuit 35, upon receiving a request from the request issuing circuit 31, the latch corresponding to the input port 0 of the request latch 302 is set. When an input is "0", indicating no request being issued, the 2-bit counter 307 performs a counting operation. An output of the 2-bit counter 307 is provided to a counter latch 303. An output of the counter latch 303 continually revises its contents from "0" to "3" based on the count from the 2-bit counter 307. As the latch of the request latch 302 corresponding to the input port 0 of the request latch 302 is set, the 2-bit counter counts "0". When the value of the counter latch 303 becomes "0", an output of a decode circuit 304 becomes "0001". Therefore, an output of AND circuit 305 corresponding to the input port 0 becomes "1". Then a message transmission-permit signal ("0001") for the input port 0 is transmitted to the packet selector circuit 114 of the output port 0 through the signal line 162. Concurrently, since the output of OR circuit 306 becomes "1", the counting operation of the 2-bit counter 307 is temporarily stopped.

Upon receiving the message transmission-permit signal ("0001") for the input port 0, the packet selector circuit 114 changes over an internal switch in such a way that an output of the input buffer 105 of the input buffers 105 to 108 can be inputted to the output buffer 118 so as to start a transmission of message from the input port 0. The message is temporarily stored in the output buffer 118. Thereafter, the message is transmitted to RCV 103 of the node 11 through the output port 0 and the signal line 170. Upon completion of the transmission of the message from the input buffer 105, the packet synchronization bit in the message header register 201 within the header decode circuit 109 becomes "1". A latch corresponding to the port 0 of the request latch 302 of the request adjustment circuit 35 within the priority controller 113 is reset through signal lines 251, 390 and 394. AND circuit 305 is turned OFF and the output of OR circuit 306 becomes "0". Thus, the 2-bit counter 307 starts to count again.

Although the foregoing is an operation of the crossbar switch 10 when a normal message is inputted from one node. If plural normal messages are inputted concurrently from a plurality of nodes to the crossbar switch 10 and requests from a plurality of input ports are issued concurrently to the same request adjustment circuit within the priority controller 113, then the messages can be transmitted without any problem by performing a sequential processing of the requests within the request adjustment circuit using a round robin process. Namely, when "1" (for example, "1010") is produced in a plurality of latches in the request latch 302 shown in FIG. 4, only one "1" is included in the output of the decode circuit 304. Further, during a period in which a message transmission-permit signal is applied to one input port, the counting operation of the 2-bit counter 307 is stopped and the output from the decode circuit 304 is not changed. Thus, the message transmission-permit signal is not concurrently set for a plurality of input ports. Due to this fact, the message at any input port (for example, port 1) is processed at first and another message at the another port (for example, port 3) is caused to wait within the input buffer until completion of the transmission. Thus, the system tends to avoid a deadlock state in which both messages are not transmitted.

Referring to FIG. 2, an operation in the crossbar switch 10 when a broadcast message is transmitted from the node 11 will be described.

The leading word of the message stored in the input buffer 105 from the node 11 is decoded at the header decode circuit 109 shown in FIG. 3 in the same manner as that for a normal message. The broadcast bit when a broadcast message is to be transmitted set to "1". Thus, at the select circuit 208, the output ("1111") of the broadcast register 207 is selected as an output destination output port address signal in place of the decode value at the destination output port address in the message header register 201. This output destination output port address signal is transmitted to the priority controller 113 together with the packet synchronization bit through the signal line 158.

At the request issuing circuit 31 within the priority controller 113 shown in FIG. 4, all the bits in the output destination output port address register 301 become "1". Thus, a request is issued to the request adjustment circuits 35 to 38 for all the output ports. An adjustment processing with respect to the request is carried out in the same manner as that for a normal message within each of the request adjustment circuits 35 to 38. Then the message transmission-permit signal for the input port "0" is transmitted to each of the packet selector circuits 114 to 117.

At each of the packet selector circuits 114 to 117, an internal switch is changed over in such a way that an output of the input buffer 105 is inputted to each of the output buffers 118 to 121. After the switch change over operation is carried out in all the packet selector circuits, the transmission of the broadcast message is started at once for each of the output ports 0 to 3.

The foregoing is an operation within the crossbar switch 10 when a broadcast message is transmitted from one node. For this situation the system may not be set to the deadlocked state. However, when the broadcast message is input concurrently to a plurality of input ports, there is a possibility that the deadlock state can occur.

The occurrence of the deadlock will be described in reference to a situation where the broadcast message is issued concurrently from the nodes 11 and 13 as shown in FIG. 2. In this case, each of the broadcast messages is stored in the input buffers 105 and 107. Thereafter, each of the requests is issued to each of the request adjustment circuits 35 to 38 from the request issuing circuits 31 and 33 within the priority controller 113 through header decode circuits 109 and 111 based on the leading words in the messages. At each of the request adjustment circuits 35 to 38, an adjustment processing is carried out in the same manner as that of a normal message. Thereafter, the message transmission-permit signal for any one of the input ports is transmitted for the packet selector circuits 114 to 117.

In the above-described situation a problem may occur in that a request processed in advance in each of the request adjustment circuits is different from the former one. For example, when the request for the input port 0 is processed at the request adjustment circuits 35 to 37 and the request for the input port 2 is processed at the request adjustment circuit 38, a message transmission-permit signal for the input port 0 is issued to the packet selector circuits 114 to 116 and a message transmission-permit signal for the input port 2 is issued to the packet selector circuit 117. As described above, the transmission of the broadcast message can not be started until the message transmission-permit signal from all the input ports has been issued and applied to the appropriate packet selector circuits. Thus, the message at the input port 0 waits for application of the message transmission-permit signal for the input port 0 to the packet selector circuit 117. Further, the message for the input port 2 waits for the message transmission-permit signal for the input port 2 applied to the packet selector circuits 114 to 116. The result is that both ports may not transmit their messages and also release the output ports. Therefore, the crossbar switch is set to a deadlocked state, thereby preventing transmission of messages.

The foregoing relates to a description of the deadlock state generated in a network constructed of a one stage crossbar switch. When the network is constructed of a multi-stage crossbar switches, the deadlock state occurs more readily. In this case, occurrence of the deadlock will be described in reference to the system in which the crossbar switch 10 illustrated in FIGS. 2 to 4 is constructed by 2×2 stages as illustrated in FIG. 12.

The system illustrated in FIG. 12 includes a plurality of nodes 801 to 808, crossbar switches 809 to 812 and signal lines 850 to 873. The nodes 801 to 808 are constructed in the same manner as the node 11 illustrated in FIG. 2. The crossbar switches 809 to 812 are constructed in the same manner as the crossbar switch 10 illustrated in FIGS. 2 through 4. The nodes 801 to 804 are connected to the crossbar switch 809 through each of the signal lines 850 to 853, and to the crossbar switch 811 through each of the signal lines 866 to 869, respectively. The nodes 805 to 808 are connected to the crossbar switch 810 through each of the signal lines 854 to 857, and to the crossbar switch 812 through each of the signal lines 870 to 873. The crossbar switch 809 is connected to the crossbar switch 811 through the signal lines 858 and 859, and to the crossbar switch 812 through the signal lines 862 and 863. The crossbar switch 810 is connected to the crossbar switch 811 through the signal lines 860 and 861, and to the crossbar switch 812 through the signal lines 864 and 865, respectively. Operations in each of the nodes and each of the crossbar switches are performed in the manner described in reference to FIGS. 2 through 4.

At first, the operation when the node 801 issues a broadcast message will be described. The broadcast message issued from the node 801 is input to the crossbar switch 809 through the signal line 850. The crossbar switch performs request issuing and request adjustment processings and then transmits the message to the crossbar switches 811 and 812. Transmission of the message toward the crossbar switch 811 is set by applying only one of the output port 0 (the signal line 858) or the output port 1 (the signal line 859). Which one of the output ports to be used is set by the broadcast register 207 within the header decode circuit illustrated in FIG. 3. A path for the crossbar switch 812 is similarly, wherein it is assumed that each of the output port 0 (the signal line 858) and the input port 2 (the signal line 862) is used. A broadcast message transmitted from the crossbar switch 809 to the crossbar switch 811 through the signal line 858 is similarly processed within the crossbar switch 811. The broadcast message is transmitted from all the output ports of the crossbar switch 811 to the nodes 801 to 804 through the signal lines 866 to 869. Also at the crossbar switch 812, the broadcast message input through the signal line 862 is transmitted from all the output ports to the nodes 805 to 808 through the signal lines 870 to 873. The execution of the broadcast is then completed.

A case where a broadcast is executed at the node 805 before executing a broadcast at the node 801 will be considered. It is assumed that the broadcast message issued from the node 805 is input to the crossbar switch 810 through the signal line 854 and further inputted each of the crossbar switches 811 and 812 from the output ports 0 and 2 through each of the signal lines 860 and 864. At this time, if a previous message is left in the input buffer of the input port 2 of the crossbar switch 812 under a state to wait for adjustment processing or during its transmission, a broadcast message is transmitted only by an amount corresponding to the vacant volume of the output buffer of the output port 2 of the crossbar switch 810 and the input buffer of the input port 2 of the crossbar switch 812. If the amount of the message is larger than the vacant volume, the transmission of the message is temporarily stopped until the previous message is processed. Since the transmissions of the broadcast message for each of the output ports are performed concurrently, the transmission for the crossbar switch 811 is also interrupted. In this case, since the operation is in the midway part of message transmission, the output ports 0 and 2 of the crossbar switch 810 are not released until the transmission of the broadcast message is completed.

The broadcast message transmitted from the crossbar switch 810 to the crossbar switch 811 through the signal line 860 before the transmission is interrupted occupies all the output ports just after adjustment processing. When there is no other message to be processed at the crossbar switch 811, the transmission to the nodes 801 to 804 is started. The crossbar switch 811 can also interrupt the transmission of the message when its output port is being occupied after transmitting a message corresponding to the amount transmitted from the crossbar switch 810.

Under this state, if the node 801 starts to execute a broadcast, the broadcast message from node 801 is transmitted to the crossbar switch 811 from the crossbar switch 809 through the signal line 858. All the output ports of crossbar switch 811 are occupied by the broadcast message from the node 805. Thus, only messages corresponding to the vacant volume of the output buffer of the output port 0 of the crossbar switch 809 and the input buffer of the input port 0 of the crossbar switch 811 is transferred and its processing is temporarily interrupted. In turn, the broadcast message transferred from the output port 2 of the crossbar switch 809 through the signal line 862 is stored in the input buffer of the input port 0 of the crossbar switch 812 so as to issue the request.

When the message left in the input port 2 of the crossbar switch 812 is completely transferred, the broadcast message from the node 801 which reached the input port 0 prior to the broadcast message from the node 805 is processed. Then transferred messages from crossbar switch 809 after performing an adjustment processing are transmitted from all the output ports to the nodes 805 to 808 through the signal lines 870 to 873. Although at the crossbar switch 809, since the transmission of the message is interrupted, the broadcast message is not allowed to flow to the last crossbar switch. Due to this fact, after the transferred message is transmitted, the crossbar switch 812 also interrupts the transmission while occupying the output port. In this way, since all the crossbar switches 809 to 812 interrupt the transmission of the broadcast message while occupying the output ports, it is not possible to transfer a message more than a set volume. Thus, a deadlock state results.

In order to avoid such a deadlock as described above, a first node for executing a broadcast is allowed to execute the broadcast while a second node for executing another broadcast must be prevented from executing the broadcast and required a procedure in which the replacement broadcast is executed. Thus, the software over head for executing the replacement broadcast and storage for storing the messages for later broadcast causes a substantial increase in the load of the nodes. Therefore, processing performance of the entire system may be reduced.

As a method for solving this problem, Japanese Patent Laid-Open No. Hei 7-262155 shows a method wherein the replacement broadcast operation is not performed by the node, but performed by a specified relay switch. In this method, at least one specified relay switch not receiving the broadcast message is set in addition to a relay switch installed at a grid point of an array type network. When the broadcast request message passes through the specified relay switch, it is changed into a broadcast message and transmitted to all the nodes. Thus, the deadlock is avoided without applying any load to the nodes and a fast broadcast function can be realized.

The above-described method for arranging the specified relay switch has some problems. That is, an amount of hardware for preparing a specified relay switch not connected to the node and an expansion crossbar switch for connecting the switch is increased. Also, there is no apparatus for performing an alternative function when malfunctions occur. Further, since all the broadcast request messages pass through the specified relay switch, a transmission path for the broadcast message is fixed. This results in an increase in the load at the specified path. Thus, performance is reduced.

SUMMARY OF THE INVENTION

An object of the present invention to provide a crossbar switch for use in a parallel computer having a plurality of computers connected to a switch type network and a broadcast communication method in which a deadlock state can be avoided and fast broadcast can be attained even when the broadcast messages concurrently reach a plurality of input ports.

Another object of the present invention is to provide a crossbar switch for use in a parallel computer having a plurality of computers connected to a switch type network and a broadcast communication method that avoids a deadlock state without performing an alternative operation of using specified nodes or relay switches.

The present invention provides a crossbar switch which includes a plurality of input ports, a plurality of output ports, and communication apparatus for transmitting messages from the input ports to the output ports. The communication apparatus includes a plurality of input buffers corresponding to the input ports, and a plurality of output buffers corresponding to the output ports. Each input buffer stores a message input by a corresponding input port. Each output buffer stores a message to be output by a corresponding output port. Also each output buffer has a capacity large enough to store a complete broadcast message.

The communication apparatus further includes apparatus for discriminating a message being input to an input port to determine whether the message is a normal message or a broadcast message, apparatus for monitoring a vacant capacity of each output buffer and issuing a broadcast transmission-permit signal when the vacant capacity of the output buffer is sufficient for storing a broadcast message, and apparatus for issuing a message transmission-permit signal for indicating that the message can be transmitted when the message is a normal message, and delaying issue of the message transmission-permit signal until the broadcast transmission-permit signal has been received from the monitoring apparatus when the message is a broadcast message. Further provided is apparatus, responsive to the message transmission-permit signal, for transferring a message stored in an input buffer to an output buffer when the message is a normal message and transferring a message stored in an input buffer to each of the output buffers when the message is a broadcast message.

The issuing apparatus includes a plurality of request issuing circuits corresponding to each of the input ports. Each request issuing circuit outputs a request corresponding to each output port to which a message stored in the input port is to be transmitted. The issuing apparatus includes a plurality of request adjustments circuits corresponding to the request issuing circuits. Each request adjustment circuit adjusts the timing of the output of the request depending on whether the message stored in the corresponding input buffer is a normal message or a broadcast message.

Further provided in the issuing apparatus is a broadcast adjustment circuit, responsive to whether a message stored in an input buffer is a normal message or a broadcast message, for immediately causing the issue of the message transmission-permit signal when the message is a normal message and delaying issue of the message transmission-permit signal when the message is a broadcast message.

A plurality of header decode circuits are provided in the communication apparatus corresponding to the input buffers. Each header decode circuit decodes a leading portion of a message stored in a corresponding input buffer. The header decode circuit outputs header information which includes information indicating whether the message stored in the corresponding input buffer is a normal message or a broadcast message and information indicating an output port to which the message is to be transferred.

The communication apparatus also includes a plurality of packet selector circuits each connected between one of the input buffers and one of the output buffers. Each packet selector circuit transfers a message from the one input buffer to at least the one output buffer in response to a message transmission-permit signal from the issuing apparatus.

BRIEF DESCRIPTION OF THE DRAWINGS

The present invention will be more apparent from the following detailed description, when taken in conjunction with the accompanying drawings, in which.

DETAILED DESCRIPTION OF THE PREFERRED EMBODIMENT

The preferred embodiment of the present invention will be described in detail as follows.

Figure 1:
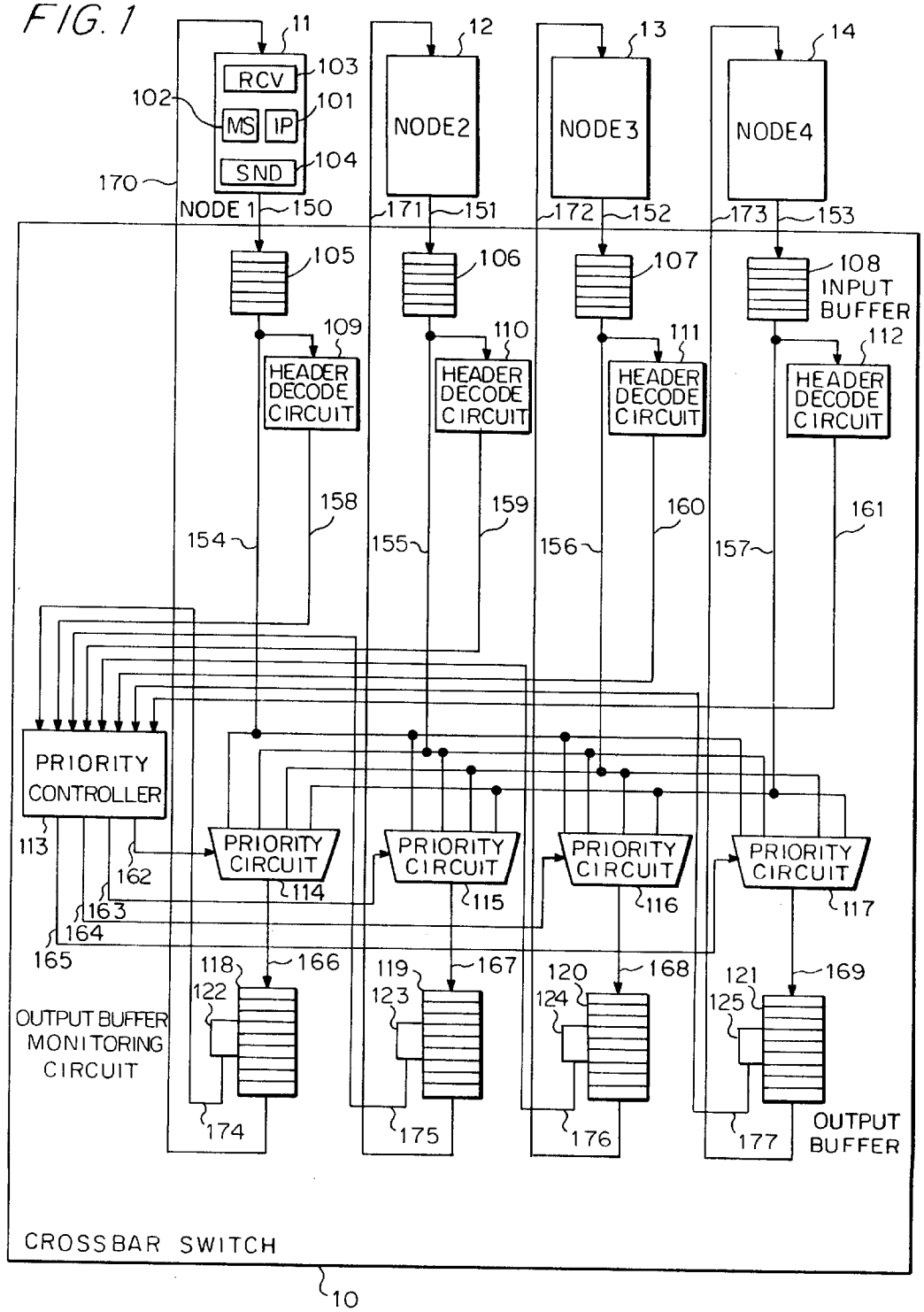
FIG. 1 is block diagram illustrating a parallel computer which includes one stage of crossbar switch having of one embodiment of the present invention.
Figure 5:
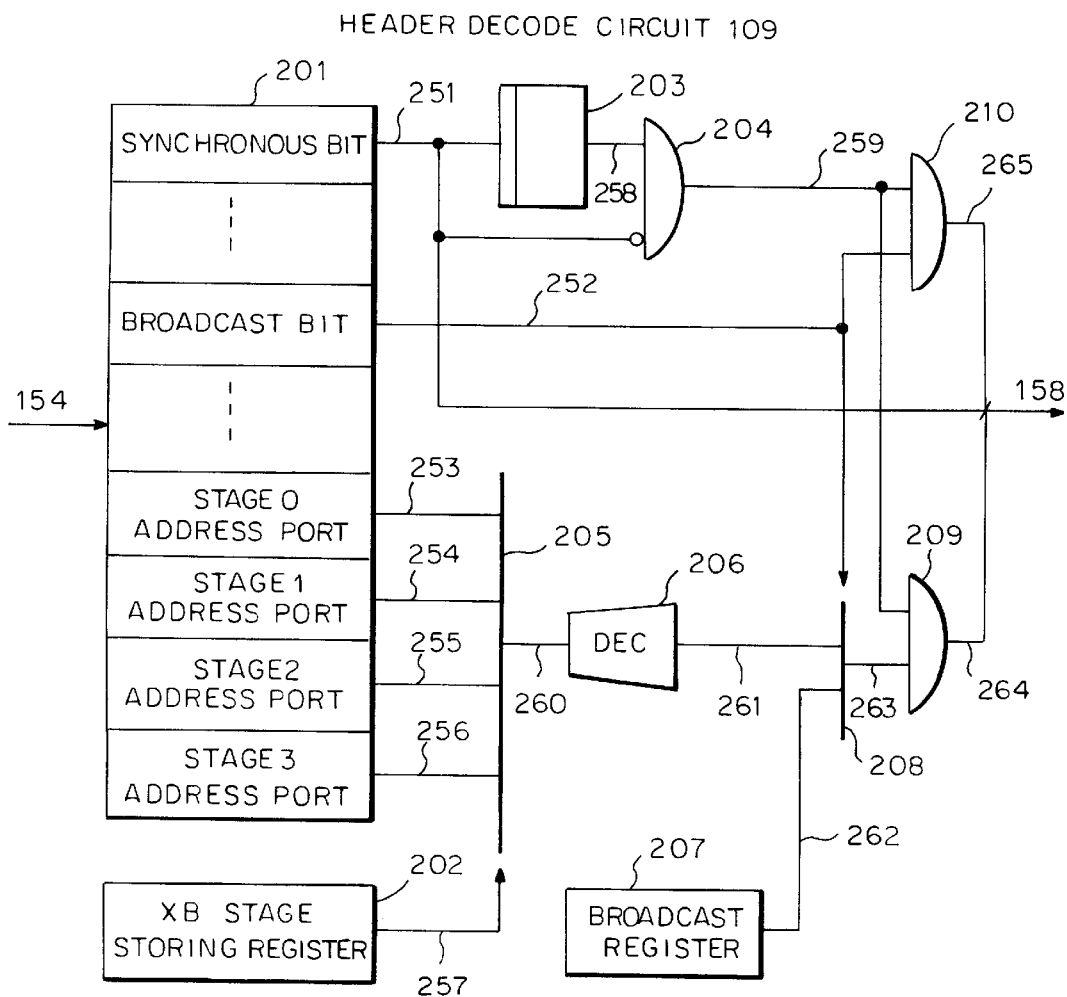
FIG. 5 is a diagram illustrating the header decode circuit of FIG. 1.
Figure 6:
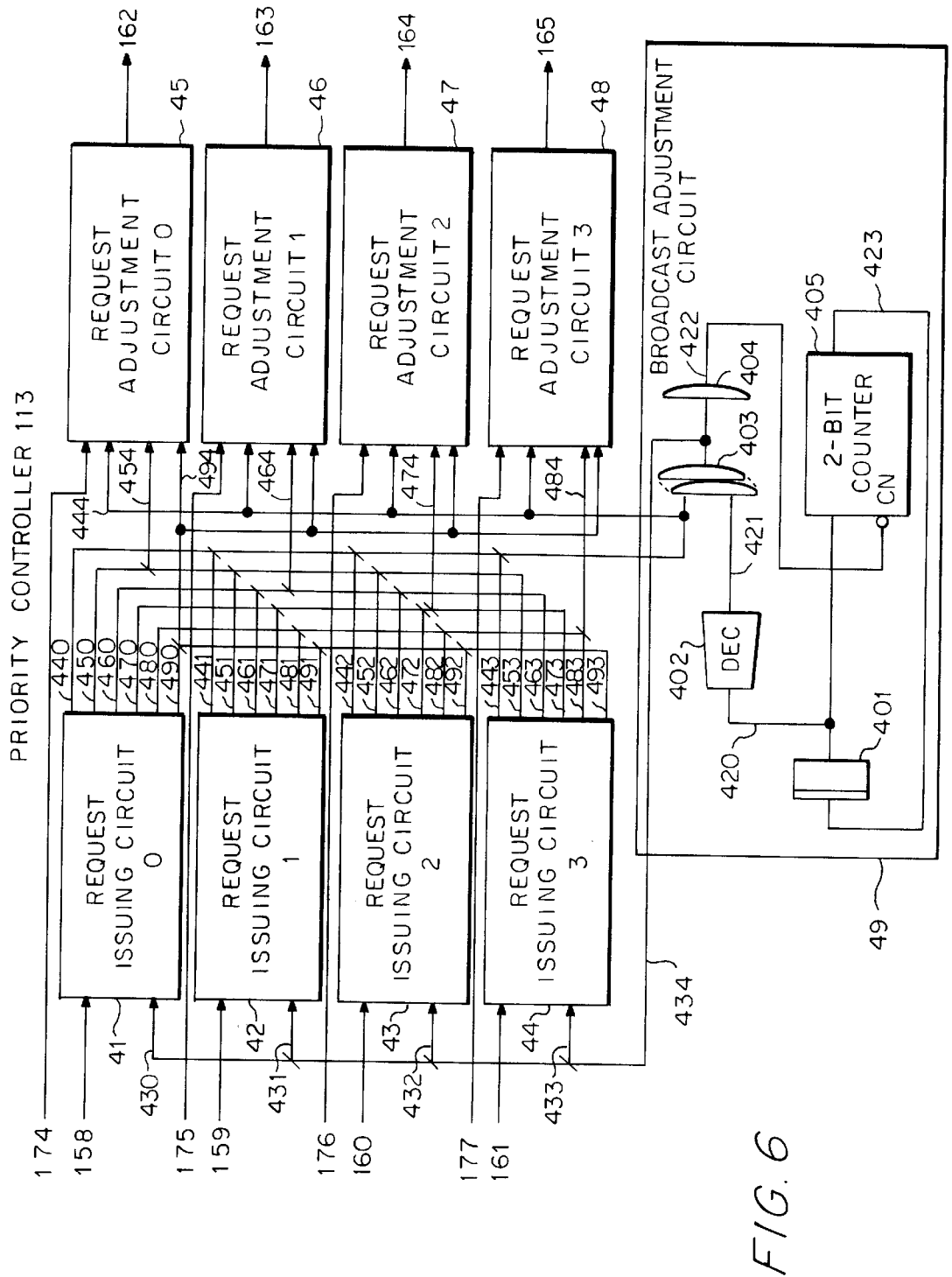
FIG. 6 is a diagram illustrating the priority controller of FIG. 1.
Figure 7:
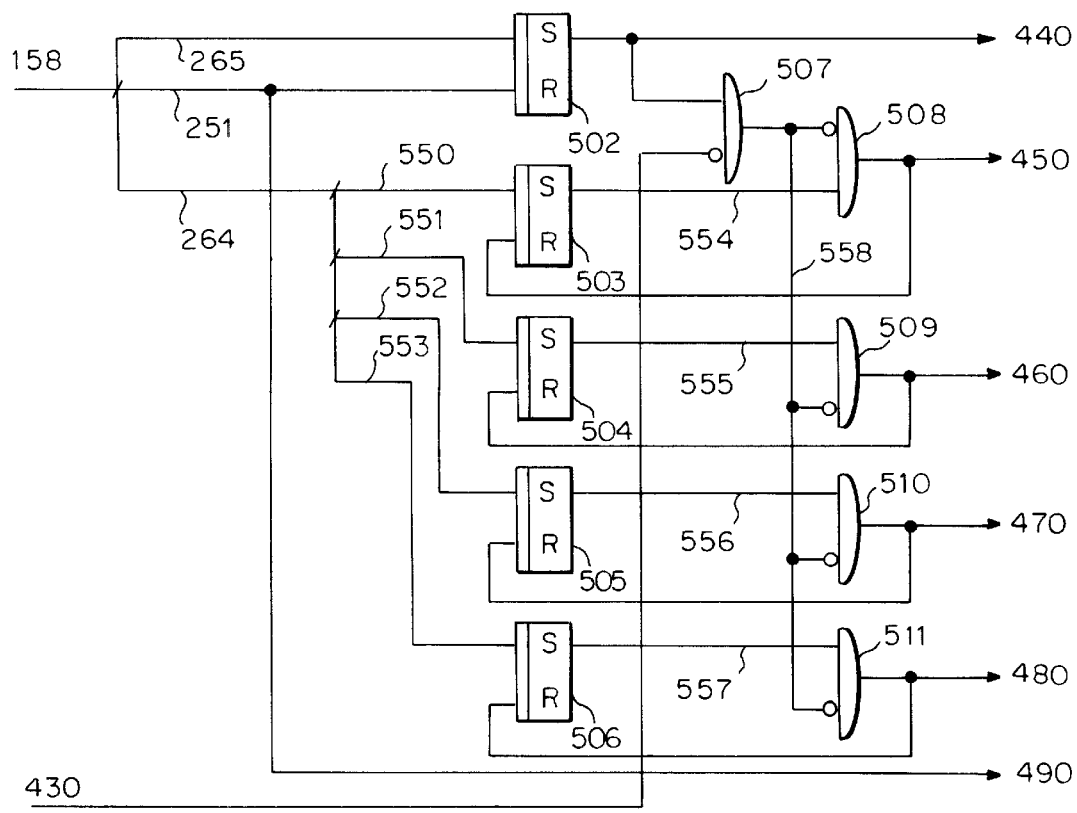
FIG. 7 is a diagram illustrating the request issuing circuit of FIG. 6.
Figure 8:
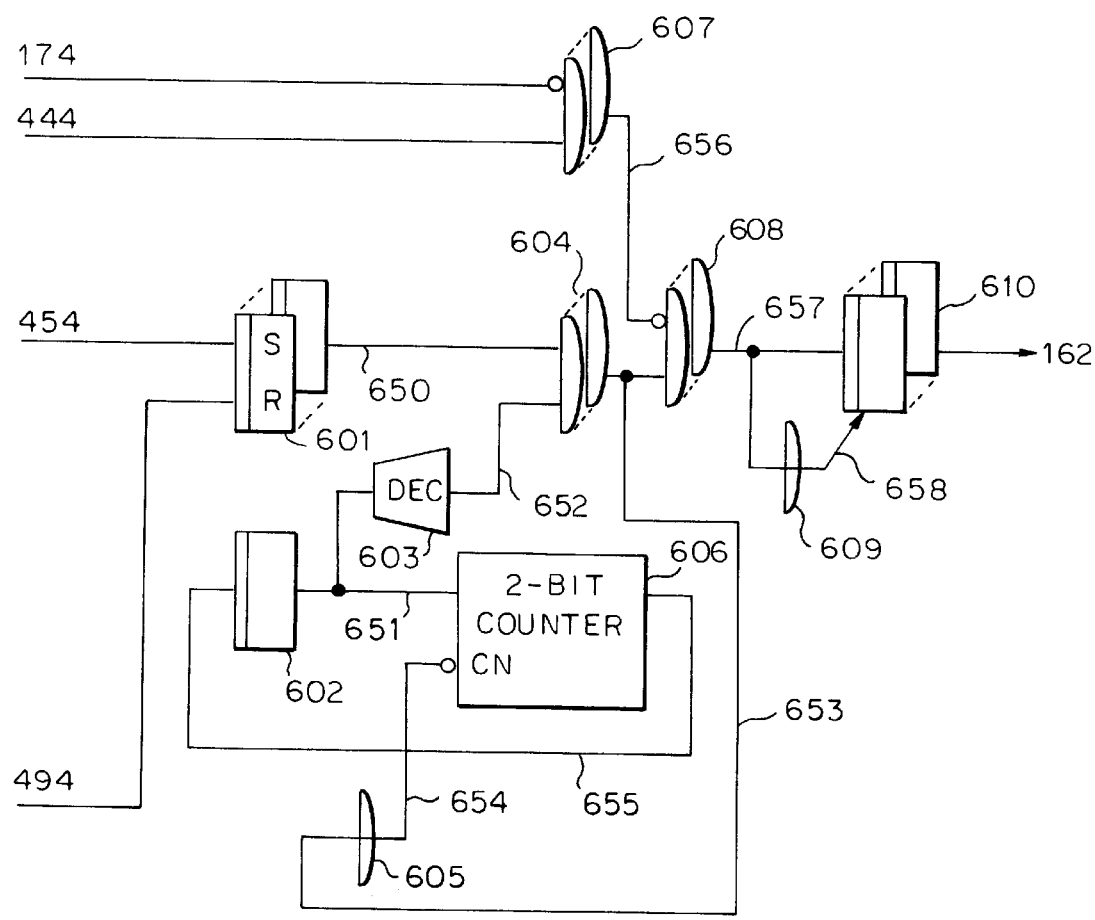
FIG. 8 is a diagram illustrating the request adjustment circuit of FIG. 6.
Figure 9:
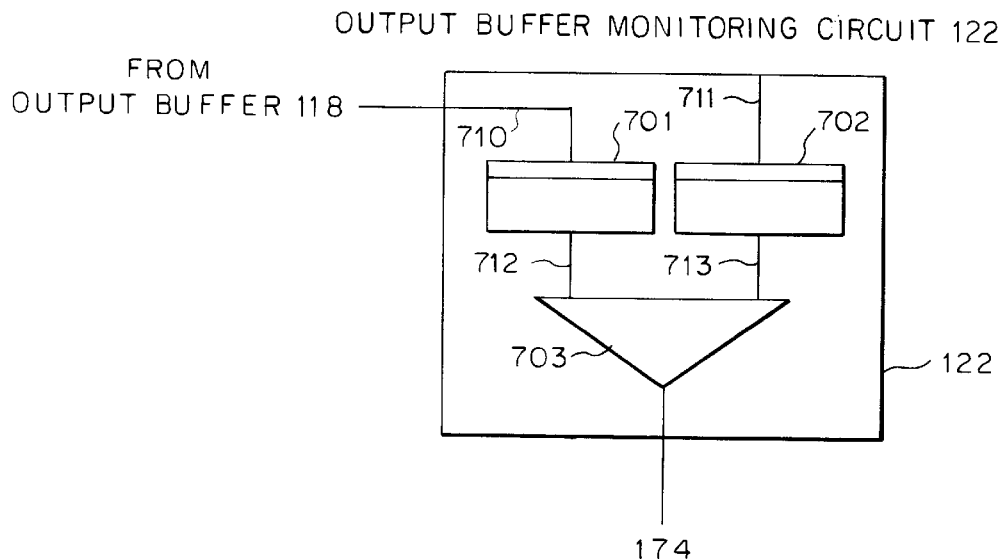
FIG. 9 is a diagram illustrating an output buffer monitoring circuit of FIG. 1.

FIG. 1 is a diagram for illustrating a parallel computer including one stage of a crossbar switch 10 having 4 nodes. It should be noted that the parallel computer of the present invention can be constructed with a plurality of stages of the crossbar switch 10. FIG. 5 is a diagram for illustrating the details of a header decode circuit shown in FIG. 1. FIG. 6 is a diagram for illustrating the details of a priority controller shown in FIG. 1. FIG. 7 is a diagram for illustrating a request issuing circuit shown in FIG. 6 and FIG. 8 is a diagram for illustrating the details of a request adjustment circuit shown in FIG. 6. FIG. 9 is a diagram for illustrating the details of an output buffer monitoring circuit shown in FIG. 1.

Figure 2:
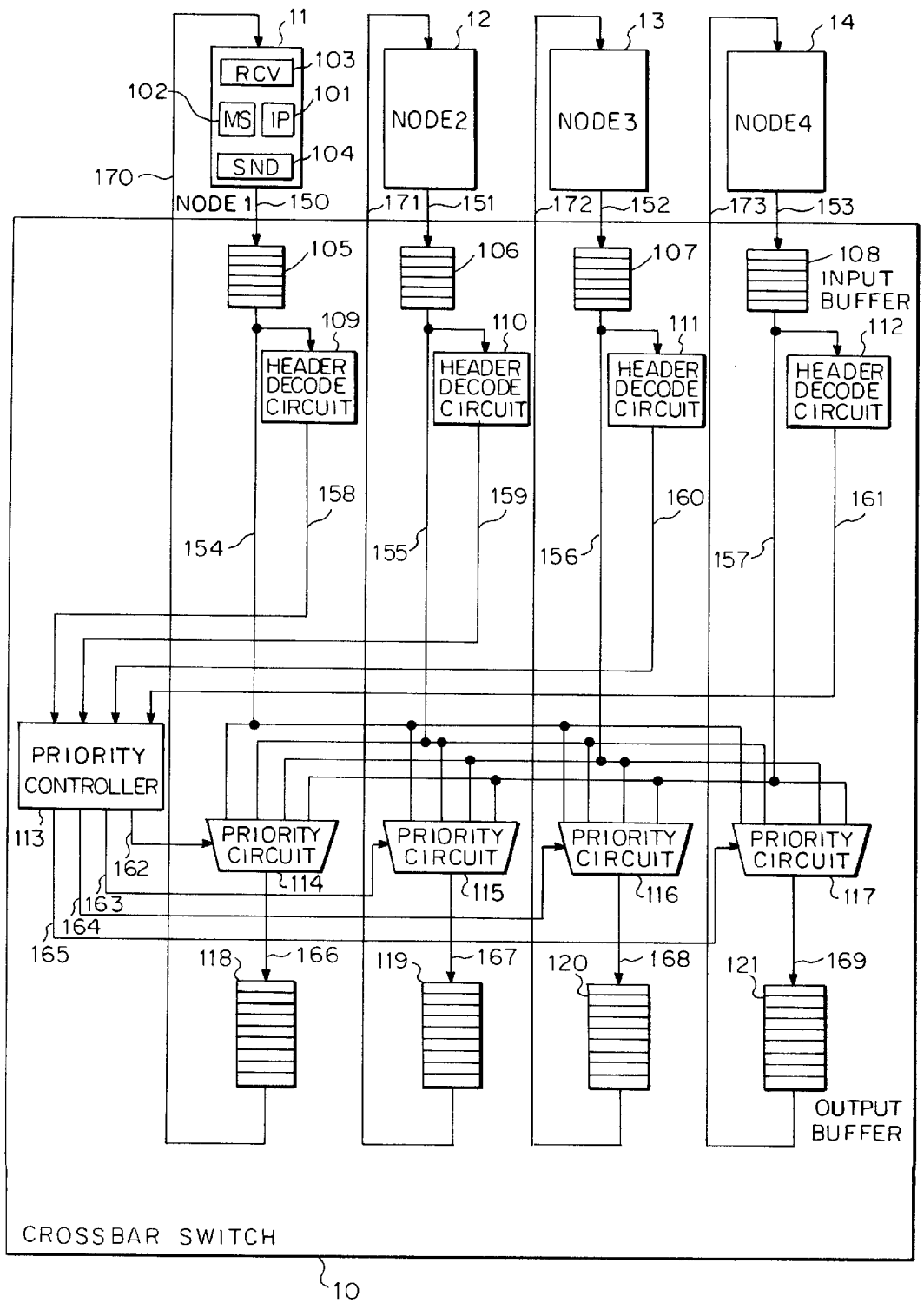
FIG. 2 is a diagram illustrating a parallel computer which includes one stage of crossbar switch having 4 nodes of the convention apparatus.

In FIG. 1, a difference between the present invention and the configuration of the conventional apparatus illustrated in FIG. 2 includes the modification of the header decode circuits 109 to 112 and the priority controller 113 and the addition of output buffer monitoring circuits 122 to 125 and the signal lines 174 to 177. The other elements are basically the same as that illustrated in FIG. 2. In addition, the output buffers 118 to 121 have a storage capacity more than at least a maximum length of a broadcast message.

The operation of the crossbar switch illustrated in FIG. 1 is as follows. The input buffers 105 to 108 receive messages from the nodes 11 to 14 through the signal lines 150 to 153 and temporarily store the messages. Thereafter the messages are transferred to the output buffers 118 to 121 through the packet selector circuits 114 to 117. The header decode circuits 109 to 112 each receives at least the header portion of a message stored at the leading end of the input buffer 105–108 through the signal lines 154 to 157, detects the header and decodes the header. As a result of the decoding the header decode circuits 109 to 112 each transmit message header information composed of a broadcast bit, an output destination output port address signal and a packet synchronization bit to the priority controller 113 through signal lines 158 to 161.

The priority controller 113 receives the message header information (output destination output port address signal, packet synchronization bit and broadcast bit) from the header decode circuits 109 to 112 through the signal lines 158 to 161. The priority controller 113 also receives the broadcast transmission-permit signal from the output buffer monitoring circuits 122 to 125, described below, through the signal lines 174 to 177, respectively. The priority controller 113 issues requests, performs adjustment processings and transmits immediately the message transmission-permit signal to packet selector circuits 114 to 117 through signal lines 162 to 165 when the message in the input buffers 105 to 108 are normal messages. Only when no other broadcast messages are present does the priority controller 113 transmit the message transmission-permit signal to the packet selector circuits 114 to 117 through the signal lines 162 to 165, respectively.

The packet selector circuits 114 to 117 receive messages from each of the input buffers 105 to 108 through the signal lines 154 to 157 and transmits the messages from the input buffer having the transmission permission corresponding to the output buffers 118 to 121 in accordance with the message transmission-permit signal from the priority controller 113. The output buffers 118 to 121 receive the messages from the packet selector circuits 114 to 117 through the signal lines 166 to 169, temporarily store the messages, and thereafter transmit the messages to the nodes 11 to 14 through the signal lines 170 to 173. The output buffer monitoring circuits 122 to 125 each monitor a vacant capacity of an output buffer 118 to 121 and transmit a broadcast transmission-permit signal to the priority controller 113 through the signal lines 174 to 177 when the vacant capacity of the output buffer 118 to 121 is sufficient for storing the complete message.

Figure 3:
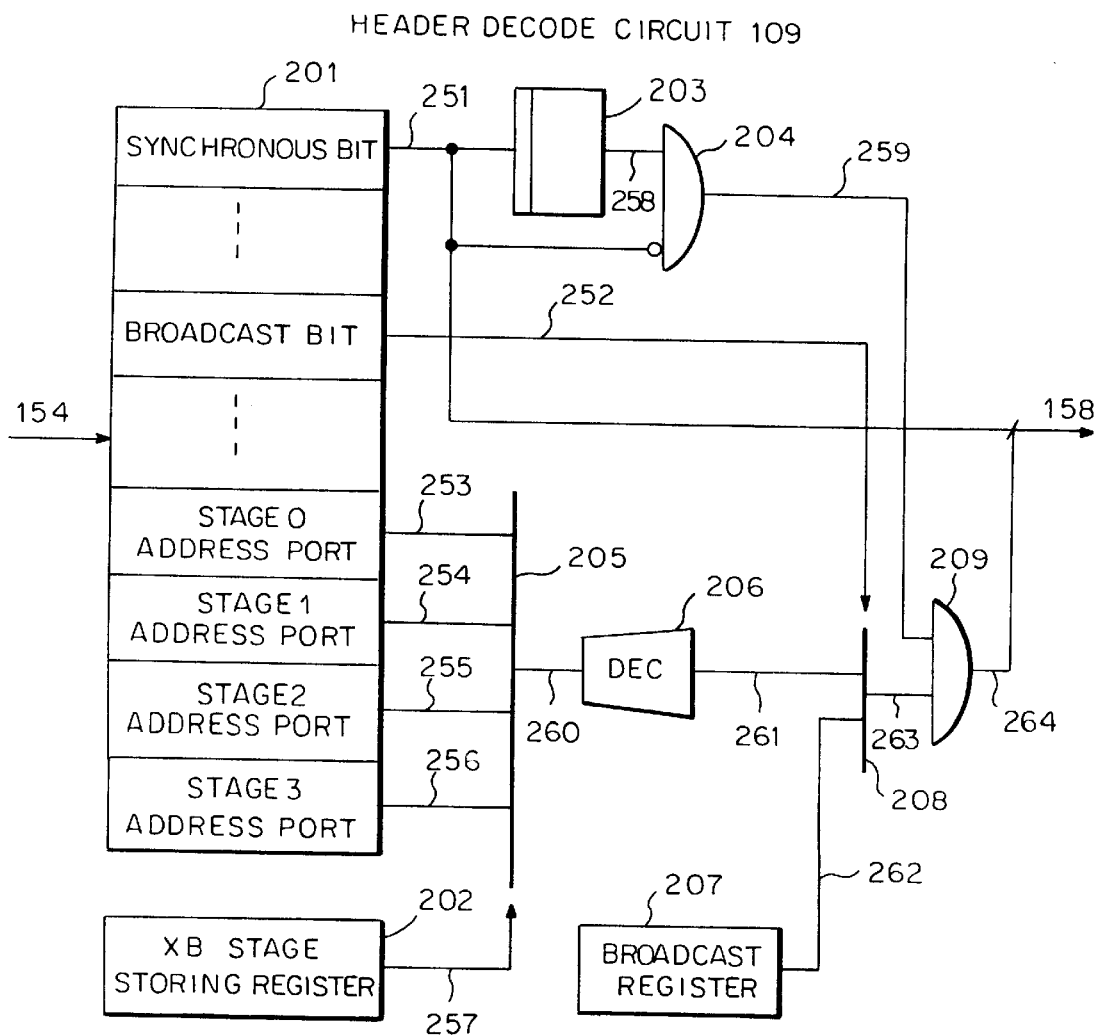
FIG. 3 is a diagram illustrating the header decode circuit of FIG. 2.

Referring to FIG. 5, the header decode circuit 109 shown in FIG. 1 will be described in detail. Each of the other header decode circuits 110 to 112 is similarly constructed. The header decode circuit 109 includes a message header register 201, a crossbar (XB) stage storing register 202, a synchronization latch 203, an AND circuit 204, a selector circuit 205, a decode circuit 206, a broadcast register 207, a select circuit 208, AND circuits 209, 210 and signal lines 251 to 265, respectively. In this case, a difference between the header decode circuit 109 illustrated in FIG. 5 and that illustrated in FIG. 3 includes an addition of the AND circuit 210 and the signal line 265. Other elements are the same as those illustrated in FIG. 3. The signal line 158 includes a bundle of signal lines 264 (4 bits), a signal line 251 (1 bit) and a signal line 265. The signal line 158 is connected to the priority controller 113 as 6-bit signal line.

As illustrated in FIG. 5, the message header register 201 receives a message word signal from the input buffer 105 through the signal line 154. The content of the message header register 201 is revised in every cycle. The synchronization latch 203 receives the packet synchronization bit in the message word through the signal line 251 and keeps it for 1 cycle. AND circuit 204 receives the packet synchronization bit in the message word through the signal line 251 and further receives a packet synchronization bit of the previous cycle from the synchronization latch 203 through the signal line 258, respectively. The AND circuit 204 detects whether the packet synchronization bit changes from "1" to "0" to discriminate the message header and transmits a header discriminating signal to the signal line 259.

AND circuit 210 receives the broadcast bit in the message header register 201 through the signal line 252, and receives a header discriminating signal from AND circuit 204 through the signal line 259, respectively. The AND circuit 210 outputs a value of the broadcast bit to the signal line 265 only when the message word being transmitted at present from the input buffer is the message header of a broadcast message. The select circuit 205 receives each of the stages 0 to 3 of destination output port addresses of the message header register 201 through each of signal lines 253 to 256 as signals to be selected and receives the number of stages of the crossbar switch from the XB stage configuration register 202 as a selecting signal through the signal line 257. The contents of the XB storing register causes the selection of one of the destination output port addresses.

The decode circuit 206 receives the destination output port address from the select circuit 205 through the signal line 260 and decodes it to a bit width of 4 bits, for example, corresponding to the four output ports. The select circuit 208 receives a decoded destination output port address from the decode circuit 206 through the signal line 261 and further receives the output port of the broadcast message from the broadcast register 207 through the signal line 262, respectively. The select circuit 208 additionally receives the broadcast bit in the message word as a select signal through the signal line 252. The select circuit 208 selects an output from the broadcast register 207 as an output port signal when the broadcast bit is "1" and an output from the decode circuit 206 when the broadcast bit is "0", respectively. AND circuit 209 receives the output port signal from the select circuit 208 through the signal line 263 and further receives the header discriminating signal from AND circuit 204 through the signal line 259, respectively. The AND circuit 209 outputs the output destination output port address signal from the decode circuit 206 or the broadcast register 207 to the signal line 264 only when the message word transmitted from the input buffer is the message header.

Thus, according to the header decode circuit 109 illustrated in FIG. 5, the output destination output port address (4 bits) in the signal line 264, the packet synchronization bit (1 bit) in the signal line 251 and the broadcast bit (1 bit) in the signal line 265 are transmitted as the message header information to the priority controller 113 through the signal line 158.

Referring to FIGS. 6 through 8, the priority controller 113 shown in FIG. 1 will be described in detail as follows.

In FIG. 6, the priority controller 113 includes request issuing circuits 41 to 44 corresponding to the input ports, request adjustment circuits 45 to 48 corresponding to the output ports, a broadcast adjustment circuit 49, and signal lines 430 to 434, 440 to 444, 450 to 454, 460 to 464, 470 to 474, 480 to 484, and 490 to 494, respectively. The signal line 434 is a 4-bit signal line in which four signal lines 430 to 433 are bundled, and each of the signal lines 444, 454, 464, 474, 484 and 494 is also a 4-bit signal line in which four signal lines 440 to 443, 450 to 453, 460 to 463, 470 to 473, 480 to 483 and 490 to 493 are bundled, respectively. The broadcast adjustment circuit 49 includes a counter latch 401, a decode circuit 402, AND circuit 403, OR circuit 404, a 2-bit counter 405 and signal lines 420 to 423. In addition, the AND circuit 403 is arranged to correspond to input ports, i.e. the request issuing circuits 41 to 44, respectively.

At first, a summary of the operation of the priority controller 113 will be described as follows. Each of the request issuing circuits 41 to 44 receives message header information (composed of a packet synchronization bit, a broadcast bit and an output destination output port address signal) from each of the header decode circuits 109 to 112 through signal lines 158 to 161. Each request issuing circuit 41 to 44 further receives the broadcast request issuing-permit signal from the broadcast adjustment circuit 49 through signal lines 430 to 433. Each request issuing circuit 41–44 further transmits the broadcast signal to each of the request adjustment circuits 45 to 48 through each of the signal lines 440 to 443, transmits a request signal through each of the signal lines 450 to 453, 460 to 463, 470 to 473 and 480 to 483 and transmits the synchronous signal through each of the signal lines 490 to 493, respectively.

In addition, the request issuing circuits 41 to 44 transmit the broadcast signal to the broadcast adjustment circuit 49 through each of the signal lines 440 to 443. Each of the request adjustment circuits 45 to 48 receives a request signal from each of the request issuing circuits 41 to 44 through signal lines 454, 464, 474 and 484, receives a packet synchronization bit through signal line 494, performs a request adjustment operation and issues the message transmission-permit signal to the packet selector circuits 114 to 117 through signal lines 162 to 165, respectively. In addition, each of the request adjustment circuits 45 to 48 receives the broadcast signal from each of the request issuing circuits 41 to 44 through a signal line 444, and receives a broadcast transmission-permit signal from each of the output buffer monitoring circuits 122 to 125 through signal lines 174 to 177. When the message received is a broadcast message, the request adjustment circuit 45–48 further issues the message transmission-permit signal to each of the packet selector circuits 114 to 117 through each of the signal lines 162 to 165 after confirmation that the broadcast transmission-permit signal is being transmitted. The broadcast adjustment circuit 49 receives the broadcast signal from each of the request issuing circuits 41 to 44 through signal line 444, processes the signals in a round robin process and issues the broadcast request issuing-permit signal to each of the request issuing circuits 41 to 44 through signal line 434.

In this case, an operation of the broadcast adjustment circuit 49 will be described briefly. The counter latch 401 receives an output of the 2-bit counter 405 through signal line 423 and keeps the input port number. The decode circuit 402 receives an output of the counter latch 401 through signal line 420 and decodes it into 4 bits. Each of AND circuits 403 corresponding to each of the input ports inputs a broadcast signal from each of the request issuing circuits 41 to 44 through signal line 444, inputs an output of the decode circuit 402 through signal line 421. When the broadcast signal is being output from the request issuing circuit for the input port number indicated by the counter latch 401, the AND circuit 403 issues the broadcast request issuing-permit signal to the request issuing circuit through signal line 434. OR circuit 404 inputs an output from each of AND circuits 403 (the broadcast request issuing-permit signal) through signal line 434 and takes its OR. The 2-bit counter 405 receives an output of the counter latch 401 through signal line 420, receives an output of OR circuit 404 through signal line 422 as a count (CN) input, continues to count while the broadcast request issuing permit signal is not transmitted, and once the broadcast request issuing-permit signal is transmitted, it interrupts the counting operation until the transmission of the broadcast message is completed.

Referring to FIG. 7, both configuration and operation of the request issuing circuit 41 will be described in detail. Each of the other request issuing circuits 42 to 44 are similarly operated. The request issuing circuit 41 includes a broadcast latch 502, output destination output port address latches 503 to 506, AND circuits 507 to 511 and signal lines 550 to 558.

As already described in reference to the header decode circuit 109 shown in FIG. 5, the output destination output port address signal transmitted through signal line 264 in the preferred embodiment is of 4 bits. These 4 bits are divided so as to correspond to the output ports 0 to 3. Each bit is input to each of the output destination output port address latches 503 to 506 through each of signal lines 550 to 553. The packet synchronization bit transmitted through signal line 251 is transmitted to each of the request adjustment circuits 45 to 48 through signal line 490 and at the same time is input to the broadcast latch 502. The broadcast bit transmitted through signal line 265 is also input to the broadcast latch 502.

The broadcast latch 502 receives a broadcast bit from the header decode circuit 109 through signal line 265 as a set signal, receives a packet synchronization bit through signal line 251 as a reset signal, holds the broadcast bit until the packet synchronization bit becomes "1" and transmits it as the broadcast signal to each of the request adjustment circuits 45 to 48 and the broadcast adjustment circuit 49 through signal line 440. Each of the output destination output port address latches 503 to 506 receives a bit corresponding to each of the output ports 0 to 3 of the output destination output port address signals as a set signal through signal lines 550 to 553, receives a request signal as a reset signal from each of AND circuits 508 to 511 through signal lines 450, 460, 470 and 480, respectively, and holds its output until the request is issued. AND circuit 507 receives a broadcast signal from the broadcast latch 502 through signal line 440 and receives a broadcast request issuing-permit signal from the broadcast adjustment circuit 49 through signal line 430. When a broadcast signal is being output, the AND circuit 507 outputs "1" until the broadcast request issuing-permit signal is asserted. Each of AND circuits 508 to 511 receives an output of each of the output destination output port address latches 503 to 506 through each of signal lines 554 to 557, and receives an output of AND circuit 507 through signal line 558. If the message is a normal message, the AND circuit 508–511 issues immediately a request and if the message is a broadcast message, it issues a request signal to the request adjustment circuits 45 to 48 through signal lines 450, 460, 470 and 480 only after receipt of the broadcast request issuing-permit signal.

Referring to FIG. 8, both configuration and operation of the request adjustment circuit 45 shown in FIG. 6 will be described in detail. In addition, other request adjustment circuits 46 to 48 are the same as above. The request adjustment circuit 45 includes a request latch 601, a counter latch 602, a decode circuit 603, AND circuit 604, OR circuit 605, a 2-bit counter 606, AND circuits 607 to 608, OR circuit 609, a message transmission-permit latch 610 and signal lines 650 to 658, respectively.

The signal line 454 is a signal line in which four signal lines 450 to 453 having request signals transmitted from each of the request issuing circuits 41 to 44 are bundled. Similarly, a signal line 494 is a signal line in which four signal lines 490 to 493 having the packet synchronization bit transmitted thereto are bundled and a signal line 444 is a signal line in which four signal lines 440 to 443 having a broadcast signal transmitted thereto are bundled. Each of the request latch 601, AND circuits 604, 607 and 608, and a message transmission-permit latch 610 is arranged in correspondence with each of the input/output ports 0 to 3, i.e. the request adjustment circuits 41 to 44, respectively. The signal line 174 in FIG. 1 to which the broadcast transmission-permit signal from the output buffer monitoring circuit 122 is transmitted is connected in common to each of AND circuits 607. A signal line 162 is a 4-bit signal line in which each of outputs of the message transmission-permit latches 610 are bundled, respectively, so as to transmit the message transmission-permit signal corresponding to the input port to have a message to be outputted to the output port 0 by the packet selector circuit 114 shown in FIG. 1.

Each of the request latches 601 receives each of the request signals from each of the request issuing circuits 41 to 44 as a set signal through a signal line 454, receives a packet synchronization bit as a reset signal through signal line 494, respectively, and holds the request for the output port 0 from each of the input ports 0 to 3 until the packet synchronization bit becomes "1". The counter latch 602 receives an output from the 2-bit counter 606 through signal line 655 and holds an input port number. The decode circuit 603 receives an output of the counter latch 602 through signal line 651 and decodes it into 4 bits. Each of AND circuits 604 corresponding to each of the input ports inputs a request held at the request latch 601 through signal line 650, inputs a decoded output of the decode circuit 603 through signal line 652, and when a request is issued from the input port having number indicated by the counter latch 602, the AND circuit corresponding to the input port outputs "1". OR circuit 605 receives an output of each of AND circuits 604 through signal line 653 and takes its OR. The 2-bit counter 606 receives an output from the counter latch 602 through signal line 651, receives an output of OR circuit 605 as a count (CN) input through signal line 654. When no request is issued from the input port having the number indicated by the counter latch 602, the 2-bit counter 606 continues to count and revises the value of the counter switch 602. If the request is issued, the 2-bit counter interrupts its counting until its corresponding request is reset, i.e. a transmission of the message is completed.

In turn, each of AND circuits 607 receives a broadcast signal from each of the request issuing circuits 41 to 44 through signal line 444 and receives a broadcast transmission-permit signal from an output buffer monitoring circuit 122 through signal line 174. If the broadcast transmission-permit is not issued, the AND circuit corresponding to the input port having the broadcast signal asserted outputs "1". Each of AND circuits 608 receives an output of each of AND circuits 604 through signal line 653, and an output of each of AND circuits 607 through signal line 656, respectively. If the message is a normal message, AND circuit 608 immediately outputs an output of the corresponding AND circuit 604 as it is. If the message is a broadcast message, AND circuit 608 outputs an output of the corresponding AND circuit 604 after confirmation that the broadcast transmission-permit signal has been asserted. OR circuit 609 receives an output of each of AND circuits 608 through signal line 657 and takes its OR. Each of the message transmission-permit latches 610 receives an output of each of AND circuits 608 through signal line 657, and an output of OR circuit 609 as an enable (EN) input. When "1" is already set in any of the outputs of AND circuit 608, the message transmission permit latch 610 issues the message transmission-permit signal for its corresponding input port to the packet selector circuit 114 through signal line 162. Since the content of the message transmission-permit latch 610 is kept until the transmission of the message is completed and a transmission-permit is set to other ports. Even if the vacant capacity of the output buffer is reduced during execution of the transmission of the broadcast message and the broadcast transmission-permit signal has been changed to not be asserted, the transmission of the broadcast message is not interrupted.

Referring to FIG. 9, both configuration and operation of the output buffer monitoring circuit 122 will be described in detail. Each of the output buffer monitoring circuits 123 to 125 are similarly constructed. The output buffer monitoring circuit 122 includes of registers 701, 702, a comparison circuit 703 and signal lines 710 to 713. It is assumed that the maximum length of a broadcast message that can be transmitted by a node is stored in the register 702.

The output buffer monitoring circuit 122 receives information of a vacant capacity from an output buffer 118 through signal line 710 and holds such information in the register 701. The comparison circuit 703 receives stored values of the registers 701 and 702 through signal lines 712 and 713, compares them and issues the broadcast transmission-permit signal to the priority controller 113 through signal line 174 when a vacant capacity of the output buffer 118 exceeds the maximum length of a broadcast message stored in the register 702.

Figure 4:
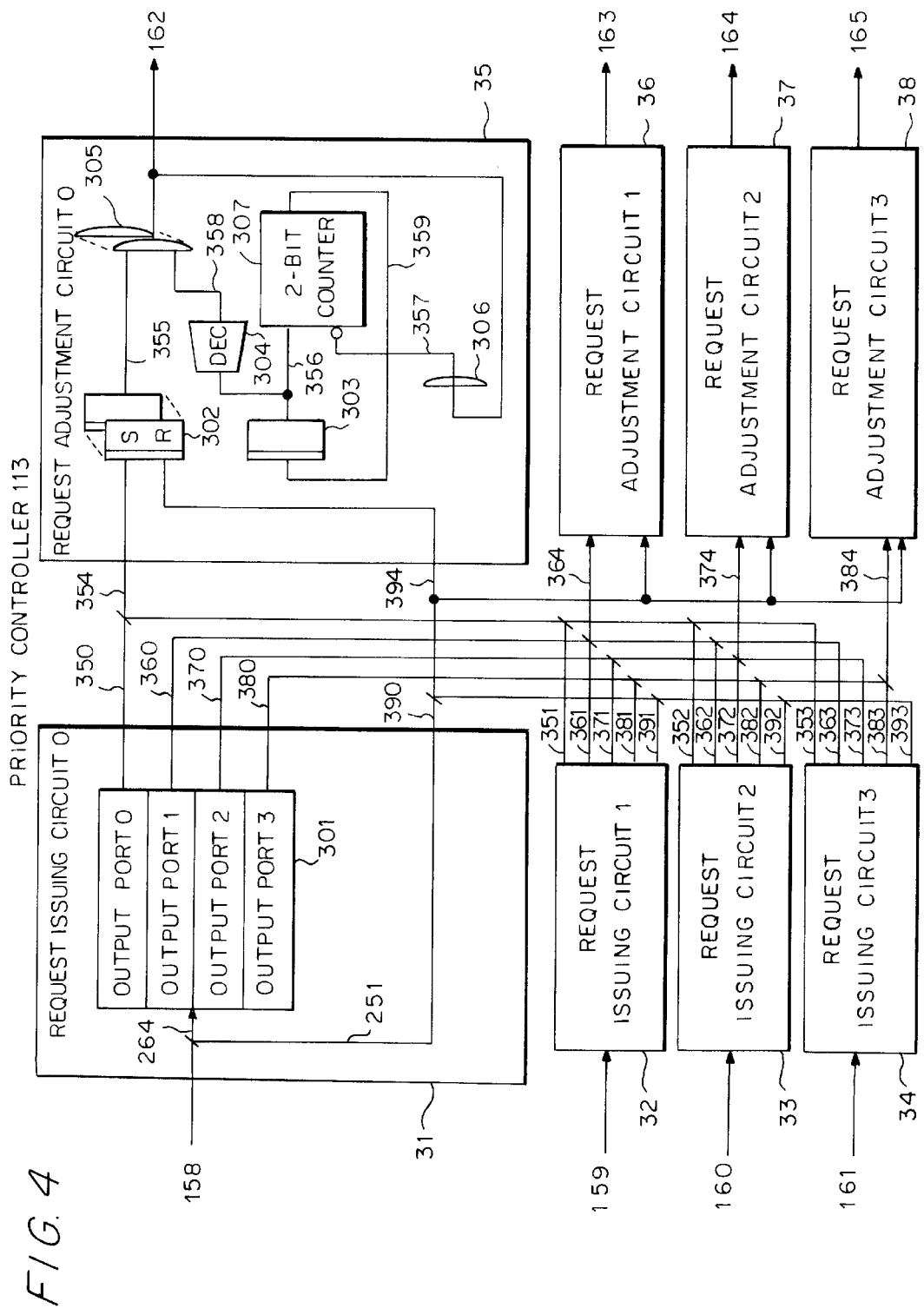
FIG. 4 is a diagram illustrating the priority controller of FIG. 2.

Referring to FIGS. 1, 5 through 9, a processing operation of the parallel computer of the preferred embodiment of the present invention will be described. The parallel computer is constructed of one stage of a crossbar switch with 4 nodes, 4 input ports and 4 output ports. The processing operation for a normal message in the present invention is similar to the conventional apparatus described in reference to FIGS. 2 through 4. Therefore, the processing operation for a broadcast message in the present invention will be described.

As one example, a case when nodes 11 and 13 executing a concurrent broadcast will be studied. Each of the broadcast messages is inputted to the crossbar switch 10 through signal lines 150 and 152, and the crossbar switch 10 temporarily stores each broadcast message in each of the input buffers 105 and 107, respectively. Each of the message headers of the broadcast messages is decoded by header decode circuits 109 and 111. The message header information (broadcast bit, output destination output port address and packet synchronization bit) is transmitted to the priority controller 113 through signal lines 158 and 160, and inputted to each of the request issuing circuits 41 and 43 shown in FIG. 6.

In the request issuing circuit 41 corresponding to the input port 0 shown in FIG. 7, the broadcast latch 502 is set by a broadcast bit of the message header through signal line 265 and its value is held until it is reset by the packet synchronization bit through signal line 251. In addition, since this is a broadcast message, the output destination output port address signal sets all the output destination output port address latches 503 to 506 through signal lines 550 to 553.

When the message input to input port 0 is a normal message, the broadcast signal is not asserted by AND circuit 210 of the header decode circuit 109 shown in FIG. 5, resulting in the output of AND circuit 507 being "0". For a normal message when the output destination output port address latches 503 to 506 are set, AND circuits 508 to 511 issue immediately a request signal to the request adjustment circuits 45 to 48 and concurrently reset the output port latches 503 to 506.

However, since the message, for this example, is a broadcast message, the broadcast signal is asserted. Thus, the output of AND circuit 507 is "1" and AND circuits 508 to 511 are in effect turned OFF. Accordingly, the request issuing circuit 41 delays the issuing of the request until the broadcast request issuing-permit signal has been received from the broadcast adjustment circuit 49. A similar processing is carried out at the request issuing circuit 43.

In the broadcast adjustment circuit 49 shown in FIG. 6, the adjustment of the issuing request is carried out in a round robin process when a plurality of broadcast messages arrive. Since the input acting as an output of the OR circuit 404 is kept at "0" until the broadcast message reaches any one of the input ports. The 2-bit counter 405 performs a counting operation, and the output of the counter latch 401 continues to revise from "0" to "3". The output from the counter latch 401 is decoded in the decode circuit 402 and waits until the broadcast signal is asserted from the input port corresponding to the output of the counter latch 401.

When broadcast messages are transmitted concurrently from the nodes 11 and 13, the broadcast signal is inputted through the signal line 444 to the items corresponding to the input ports 0 and 2. Namely, the broadcast signal is input to the AND circuit 403 in the broadcast adjustment circuit 49 through the signal lines 440, 442 from the request issuing circuits 41, 43. The broadcast request issuing-permit signal is issued to any one of the request issuing circuits of the port 0 or 2 through signal line 434 in reference to the value of the counter latch 401.

The issuing of the broadcast request issuing-permit signal to the request issuing circuit 41 of the input port 0 will be described as follows. As the broadcast request issuing-permit signal is transmitted to the request issuing circuit 41 through signal lines 434, 430, an output of AND circuit 507 shown in FIG. 7 becomes "0" and a request signal is issued to the request adjustment circuits 45 to 48 through signal lines 450, 460, 470 and 480 from AND circuits 508 to 511. Further, concurrently the output destination output port address latches 503 to 506 are reset. In addition, the broadcast latch 502 is reset upon completion of transmission of the broadcast message at the input port 0. With such an arrangement as described above, the 2-bit counter 405 in the broadcast adjustment circuit 49 restarts a counting operation.

As to the broadcast message at the input port 2 whose transmission has been interrupted, after the transmission of the broadcast message at the port 0 is completed, the 2-bit counter 405 in the broadcast adjustment circuit 49 restarts a counting operation and the request issuing circuit 43 receives the broadcast request issuing-permit signal through signal lines 434, 432 while waiting until the value of the counter latch 401 becomes "2". Thereafter, a request is issued to the request adjustment circuits 45 to 48. In the request adjustment circuit 45 illustrated in FIG. 8, "1" is set to an item corresponding to the input port 0 of the request latch 601 through issuing of a request from the input port 0. The 2-bit counter 606 performs a counting operation until the request is received due to the fact that input is "0" and an output of the counter latch 602 continues a revision from "0" to "3". When, the request is input from the input port 0, the 2-bit counter 606 performs a counting operation, and "1" is set at an output corresponding to the input port 0 of AND circuit 604 in response to a decode output of the decode circuit 603 until the value of the counter latch 602 becomes "0". Then the counting operation of the 2-bit counter 606 is terminated.

When a normal message is requested, the broadcast signal is not asserted, resulting in the output corresponding to the port 0 of AND circuit 607 being made "0". The output of the input port 0 at AND circuit 604 immediately appears at the output at AND circuit 608 in the same manner as above. After the output is stored in the corresponding latch of the message transmission-permit latch 610, it is transmitted as the message transmission-permit signal ("0001") for the input port 0 to the packet selector circuit 114 through signal line 162.

However, since the message just arrived is the broadcast message, the broadcast signal is asserted, and the message transmission-permit signal is issued as follows until after the broadcast transmission-permit signal is issued from the output buffer monitoring circuit 122. In the output buffer monitoring circuit 122 shown in FIG. 9, a vacant capacity of the output buffer 118 is always monitored. If the vacant capacity is less than the maximum length of a broadcast message stored in the register 702, a transmission of the broadcast message is prohibited. As the vacant capacity is increased, the broadcast transmission-permit signal is issued to the priority controller 113 through signal line 174. If the broadcast transmission-permit signal is not issued, an output corresponding to the input port 0 of AND circuit 607 is "1", an output corresponding to AND circuit 608 is "0". A corresponding latch of the message transmission-permit latch 610 is kept in its reset state and the message transmission-permit signal is not issued. When the broadcast transmission-permit signal is issued, an output corresponding to the input port 0 of AND circuit 607 becomes "0". At this time, an output at AND circuit 604 appears at the corresponding output of AND circuit 608. This output is transmitted to OR circuit 609 and the corresponding latch of the message transmission-permit latch 610 through signal line 657. This output is further transmitted to the packet selector circuit 114 as the message transmission-permit signal ("0001") for the input port 0 through signal line 162.

A similar processing is also carried out in each of the request adjustment circuits 46 to 48. Although a certain time span is present, the message transmission-permit signal ("0001") for each of the input ports is issued to the packet selector circuits 115 to 117.

At the packet selector circuits 114 to 117, as the message transmission-permit signal ("0001") for the input port 0 is received, an internal switch is changed over in such a way that each of the outputs of the input buffer 105 may be inputted to the output buffers 118 to 121. After confirmation of completion of the changing-over operation at the packet selector circuits, the broadcast message is concurrently transmitted from the input buffer 105 to all the output buffers 118 to 121. Upon completion of the transmission of the broadcast message at the input port 0, an adjustment of the broadcast message at the input port 2 is carried out and the broadcast message is transmitted in the same manner as that of the input port 0.

Figure 10:
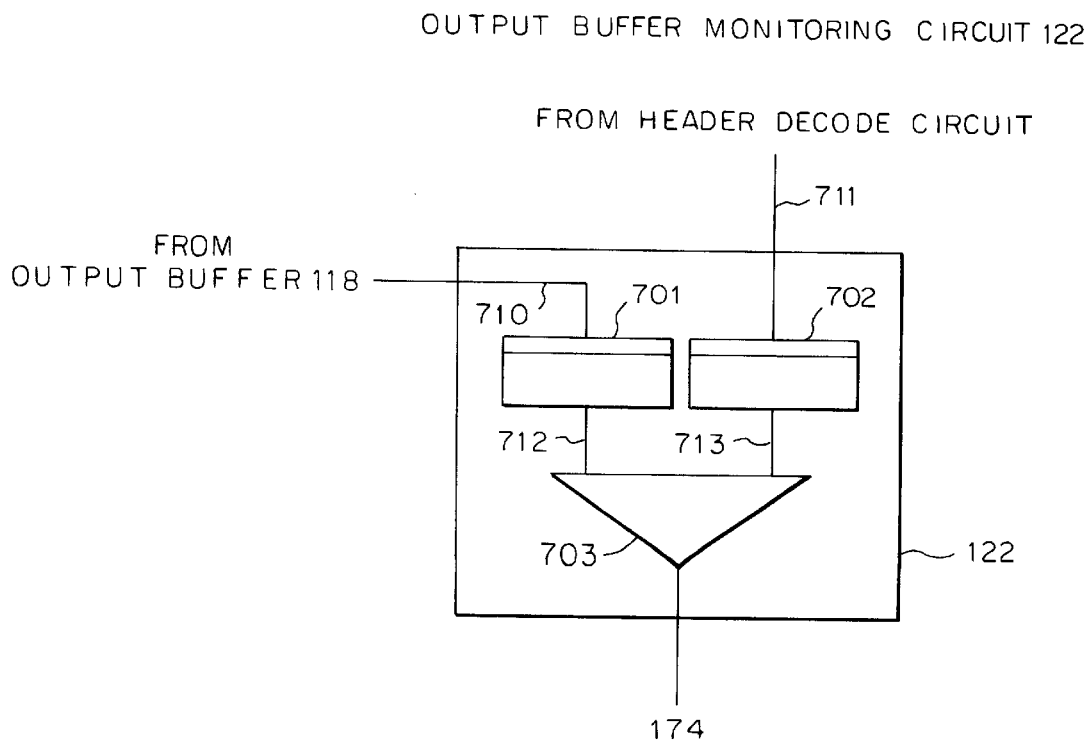
FIG. 10 is a diagram illustrating another embodiment of the output buffer monitoring circuit of FIG. 1.
Figure 11:
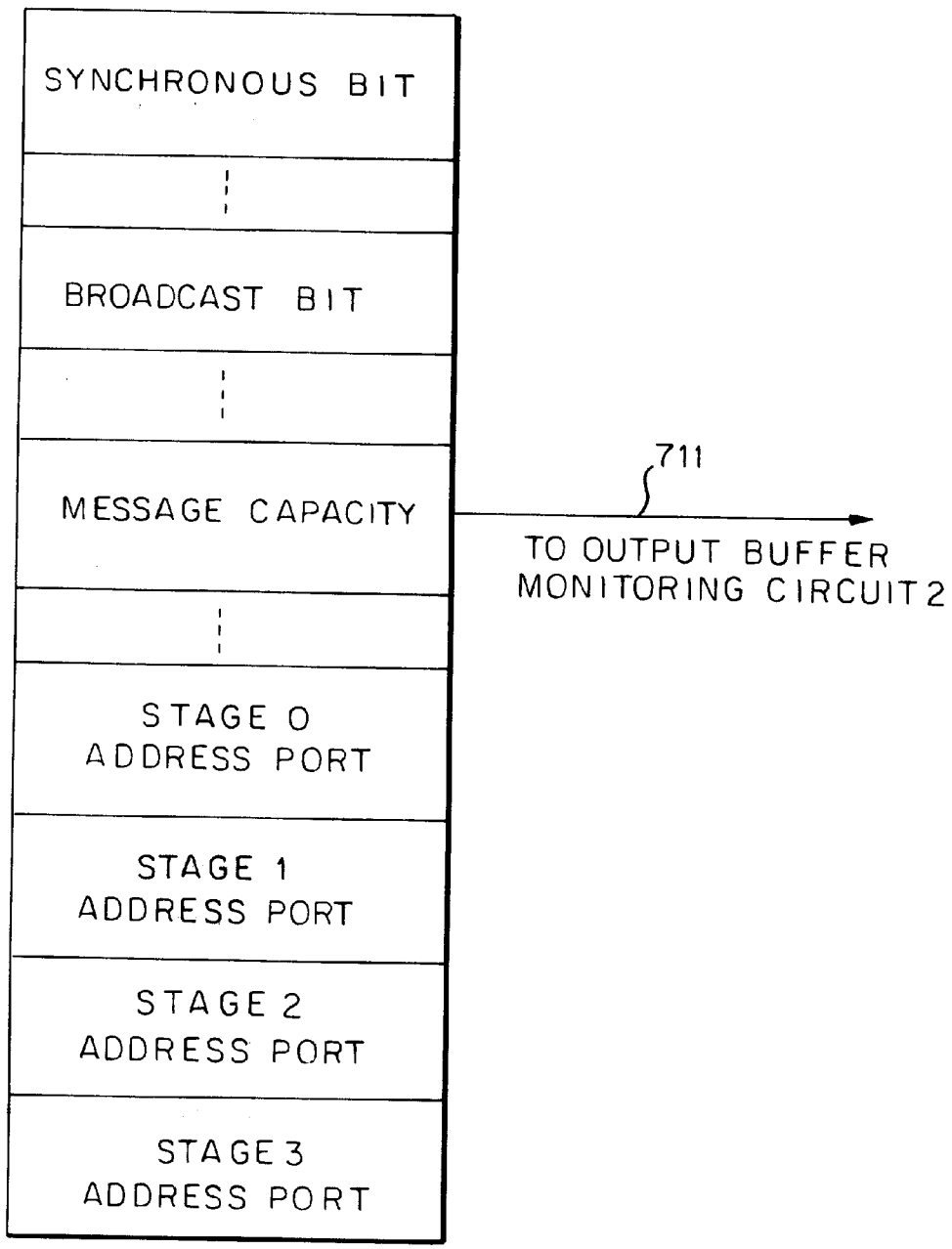
FIG. 11 is an example of a message header used by the output buffer monitoring circuit of FIG. 10.

In FIG. 10 is illustrated another embodiment of the output buffer monitoring circuit. In this circuit a message length in the message header is shown in FIG. 11 is stored and is utilized this in a comparing operation with the vacant amount of the output buffer. The output buffer monitoring circuit 122 receives the message length read out of the message header within the header decode circuit 158 through signal line 711 and stores it in the register 702. The vacant capacity of the output buffer 118 is stored in the register 701. The comparison circuit 703 compares an output buffer vacant capacity of the register 701 with a message length of the register 702. When a vacant capacity more than the message length can be assured, the broadcast transmission-permit signal is transmitted to the priority controller 113 through signal line 174. Other output buffer monitoring circuits 123 to 125 are similarly operated. In the case of this embodiment, a transmission of the broadcast message can be performed efficiently even if the length of the broadcast message is lower than its maximum length.

Figure 12:
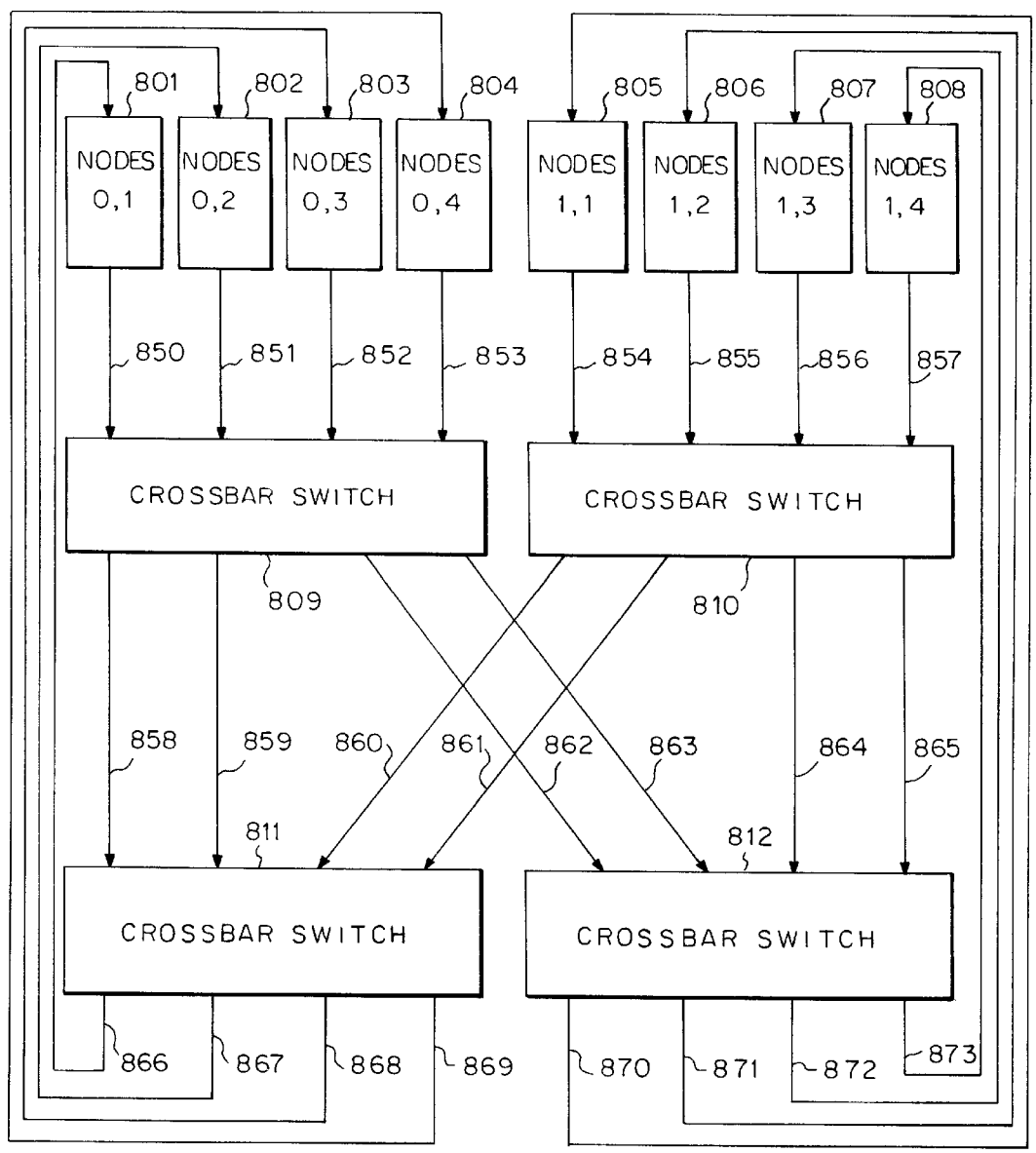
FIG. 12 is a diagram illustrating one preferred embodiment of a parallel computer which includes crossbar switches of 2×2 stages with 8 nodes.
Figure 13:
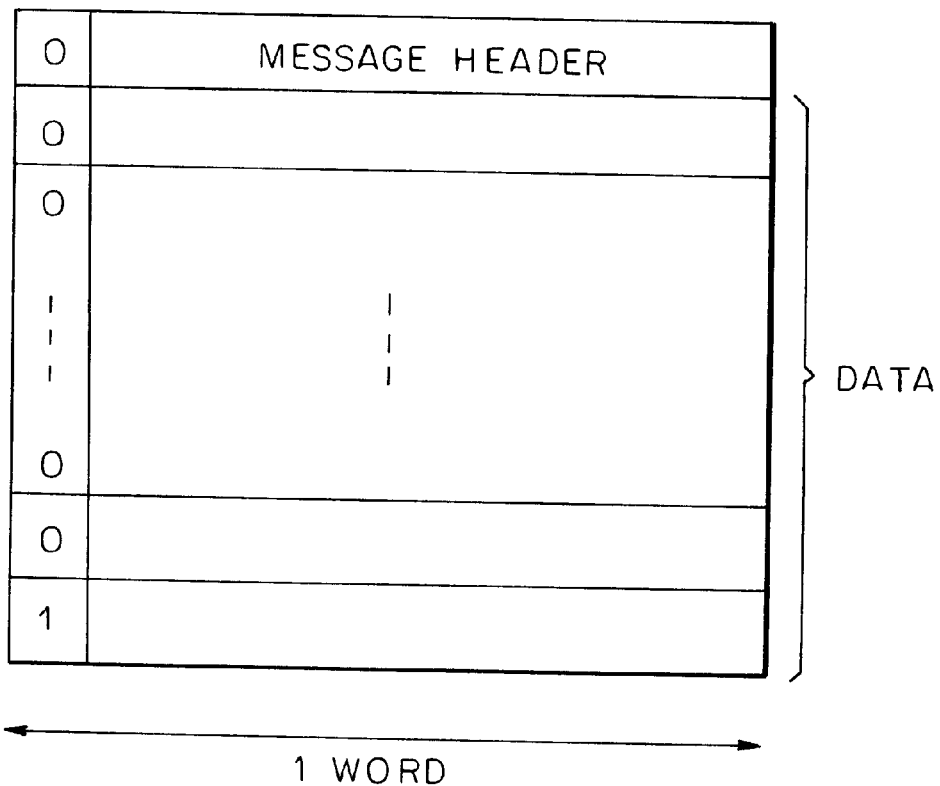
FIG. 13 is one example of a format of a message to be transmitted from the node to the crossbar switch.

In the first embodiment shown in FIG. 1 as described above, the number of requests of the broadcast message for performing a concurrent processing within the crossbar switch is limited to 1. Thus, it is possible to avoid occurrence of deadlock while conflicts to get a path within the same crossbar switch occurs. At the same time the vacant capacity of the output buffers in all the output destination output ports addresses to be used by the broadcast message is monitored and a transmission of the broadcast message is delayed until there is enough vacant capacity in each of the output buffers to store the complete broadcast message. The result is that it is possible to avoid a situation where the transmission is interrupted while the message is being left in the input buffer in the midway part of the transmission of the broadcast message. It is also possible to avoid the deadlock state in which the broadcast message causes a multi-stage crossbar switch not to release the output port. The above-described state is the same whether the crossbar switch is constructed in 2×2 stages as illustrated in FIG. 12, for example, or a multi-stage configuration. In either case, the broadcast function can be realized without producing any deadlock.

As described above, in accordance with the present invention, the number of broadcast messages for performing a concurrent processing within either the crossbar switch type or switch type network is limited to 1. It is possible to avoid an occurrence of the deadlock state while the broadcast messages conflict with each other to gain use of a path within the crossbar switch or the network. In addition, a broadcast message of an amount greater than a maximum capacity of an output buffer is provided in the crossbar switch or the network and such a broadcast message is transmitted only when the vacant capacity of the output buffers of all the output addresses are capable of storing the broadcast message. Thus, it is possible to avoid the state in which the message is accumulated at the crossbar switch or multi-stages of the network to generate the deadlock state.

While the present invention has been described in detail and pictorially in the accompanying drawings it is not limited to such details since many changes and modifications recognizable to those of ordinary skill in the art may be made to the invention without departing from the spirit and the scope thereof.

We claim:

1. A crossbar switch which includes a plurality of input ports, a plurality of output ports, and communication apparatus for transmitting messages from said input ports to said output ports, said communication apparatus comprising:

a plurality of input buffers corresponding to said input ports, each input buffer stores a message input by a corresponding input port;

a plurality of output buffers corresponding to said output ports, each output buffer stores a message to be output by a corresponding output port;

means for discriminating a message being input to an input port to determine whether said message is a normal message or a broadcast message;

means for monitoring a vacant capacity of each output buffer and issuing a broadcast transmission-permit signal when the vacant capacity of the output buffer is sufficient for storing a broadcast message;

means for issuing a message transmission-permit signal for indicating that said message can be transmitted when said message is a normal message, and delaying issue of said message transmission-permit signal until said broadcast transmission-permit signal has been received from said monitoring means when said message is a broadcast message; and means, responsive to said message transmission-permit signal, for transferring a message stored in an input buffer to an output buffer when said message is a normal message and transferring a message stored in an input buffer to each of the output buffers when said message is a broadcast message.

2. A communication apparatus according to claim 1, wherein said means for issuing comprises:

a plurality of request issuing circuits corresponding to each of the input ports, each request issuing circuit outputs a request corresponding to each output port to which a message stored in said input port is to be transmitted.

3. A communication apparatus according to claim 2, wherein said means for issuing further comprises:

a plurality of request adjustments circuits corresponding to said request issuing circuits, each request adjustment circuit adjusting the timing of the output of the request depending on whether the message stored in the corresponding input buffer is a normal message or a broadcast message.

4. A communication apparatus according to claim 3, wherein said means for issuing further comprises:

a broadcast adjustment circuit, responsive to whether a message stored in an input buffer is a normal message or a broadcast message, for immediately causing the issue of the message transmission-permit signal when the message is a normal message and delaying issue of the message transmission-permit signal when the message is a broadcast message.

5. A communication apparatus according to claim 1, further comprising:

a plurality of header decode circuits corresponding to said input buffers, wherein each header decode circuit decodes a leading portion of a message stored in a corresponding input buffer.

6. A communication apparatus according to claim 5, wherein said header decode circuit outputs header information which includes information indicating whether said message stored in the corresponding input buffer is a normal message or a broadcast message and information indicating an output port to which the message is to be transferred.

7. A communication apparatus according to claim 4, further comprising:

a plurality of header decode circuits corresponding to said input buffers, wherein each header decode circuit decodes a leading portion of a message stored in a corresponding input buffer.

8. A communication apparatus according to claim 7, wherein said header decode circuit outputs header information which includes information indicating whether said message stored in the corresponding input buffer is a normal message or a broadcast message and information indicating an output port to which the message is to be transferred.

9. A communication apparatus according to claim 1, further comprising:
   a plurality of packet selector circuits each connected between one of said input buffers and one of said output buffers,
   wherein each packet selector circuit transfers a message from the one input buffer to at least the one output buffer in response to a message transmission-permit signal from said means for issuing.

10. A communication apparatus according to claim 6, further comprising:
   a plurality of packet selector circuits each connected between one of said input buffers and one of said output buffers,
   wherein each packet selector circuit transfers a message from the one input buffer to at least the one output buffer in response to a message transmission-permit signal from said means for issuing.

11. A communication apparatus according to claim 8, further comprising:
   a plurality of packet selector circuits each connected between one of said input buffers and one of said output buffers,
   wherein each packet selector circuit transfers a message from the one input buffer to at least the one output buffer in response to a message transmission-permit signal from said means for issuing.

12. A communication apparatus according to claim 1, wherein each output buffer has a capacity greater than a maximum length of a broadcast message.

13. A communication apparatus according to claim 2, wherein each output buffer has a capacity greater than a maximum length of a broadcast message.

14. A communication apparatus according to claim 5, wherein each output buffer has a capacity greater than a maximum length of a broadcast message.

15. A communication apparatus according to claim 9, wherein each output buffer has a capacity greater than a maximum length of a broadcast message.

16. A broadcast communication method in a crossbar switch which includes a plurality of input ports, a plurality of output ports, and communication apparatus for transmitting messages from said input ports to said output ports, said broadcast method comprising the steps of:
   discriminating a message being input to an input port to determine whether said message is a normal message or a broadcast message;
   monitoring a vacant capacity of each of a plurality of output buffers corresponding to the output ports, said output buffers each store a message to be output to a corresponding output port;
   issuing a broadcast transmission-permit signal when the vacant capacity of an output buffer is sufficient for storing a broadcast message;
   issuing a message transmission-permit signal for indicating that a message can be transmitted when said message is a normal message, and delaying issue of said message transmission-permit signal until said broadcast transmission-permit signal has been issued when said message is a broadcast message; and
   responsive to said message transmission-permit signal, transferring a message stored in an input buffer corresponding to said input port to an output buffer when said message is a normal message and transferring a message stored in said input buffer to each of the output buffers when said message is a broadcast message.

17. A broadcast method according to claim 16, wherein said issuing a message step comprises the step of:
   outputting a request corresponding to each output port to which a message stored in said input port is to be transmitted.

18. A broadcast method according to claim 17, wherein said issuing a message step further comprises the step of:
   adjusting the timing of the output of the request depending on whether the message stored in the corresponding input buffer is a normal message or a broadcast message.

19. A broadcast method according to claim 18, wherein said issuing a message step further comprises the step of:
   responsive to whether a message stored in an input buffer is a normal message or a broadcast message, immediately causing the issue of the message transmission-permit signal when the message is a normal message and delaying issue of the message transmission-permit signal when the message is a broadcast message.

20. A broadcast method according to claim 16, further comprising the step of:
   decoding a leading portion of a message stored in each input buffer.

21. A broadcast method according to claim 20, wherein said decoding step comprises the step of:
   outputting header information which includes information indicating whether said message stored in the input buffer is a normal message or a broadcast message and information indicating an output port to which the message is to be transferred.

22. A broadcast method according to claim 19, further comprising the step of:
   decoding a leading portion of a message stored in each input buffer.

23. A broadcast method according to claim 16, further comprising the step of:
   transferring a message from one input buffer to at least one output buffer in response to said message transmission-permit signal.

24. A broadcast method according to claim 21, further comprising the step of:
   transferring a message from one input buffer to at least one output buffer in response to said message transmission-permit signal.

25. A broadcast method according to claim 23, further comprising the step of:
   transferring a message from one input buffer to at least one output buffer in response to said message transmission-permit signal.

26. A broadcast method according to claim 16, wherein each output buffer has a capacity greater than a maximum amount of a broadcast message.

27. A broadcast method according to claim 17, wherein each output buffer has a capacity greater than a maximum amount of a broadcast message.

28. A broadcast method according to claim 20, wherein each output buffer has a capacity greater than a maximum amount of a broadcast message.

29. A broadcast method according to claim 24, wherein each output buffer has a capacity greater than a maximum amount of a broadcast message.

* * * * *